(12) United States Patent  
Lawton et al.

(10) Patent No.: US 9,126,317 B2  
(45) Date of Patent: Sep. 8, 2015

(54) TOOL APPARATUS SYSTEM AND METHOD OF USE

(75) Inventors: Chris Lawton, Costa Mesa, CA (US); Jie Li, Rancho Santa Margarita, CA (US); De L. San, La Verne, CA (US); Nathan Lee, Escondido, CA (US)

(73) Assignee: Snap-on Incorporated, Kenosha, WI (US)

( * ) Notice: Subject to any disclaimer, the term of this patent is extended or adjusted under 35 U.S.C. 154(b) by 743 days.

(21) Appl. No.: 13/295,719

(22) Filed: Nov. 14, 2011

(65) Prior Publication Data

US 2012/0234569 A1   Sep. 20, 2012

Related U.S. Application Data

(63) Continuation-in-part of application No. 13/117,670, filed on May 27, 2011, now Pat. No. 8,281,871, which is a continuation of application No. 11/679,113, filed on Feb. 26, 2007, now Pat. No. 7,954,557, which is a (Continued)

(51) Int. Cl.  
*B25B 23/14* (2006.01)  
*B25B 21/00* (2006.01)  
(Continued)

(52) U.S. Cl.  
CPC .................. *B25B 23/14* (2013.01); *B25B 21/00* (2013.01); *B25B 23/1425* (2013.01); *B60B 29/003* (2013.01); *B60B 2900/3312* (2013.01); *B60B 2900/3315* (2013.01)

(58) Field of Classification Search  
CPC ........... G01L 1/00; G05B 19/182; B25F 5/00; H01Q 1/24; B25B 23/14  
USPC ............................. 173/2, 176, 181; 73/862.21  
See application file for complete search history.

(56) References Cited

U.S. PATENT DOCUMENTS

| 3,370,446 | A | * | 2/1968 | Francis .............................. 70/58 |
| 3,926,264 | A | | 12/1975 | Bardwell et al. |
| 4,081,037 | A | | 3/1978 | Jonsson |

(Continued)

FOREIGN PATENT DOCUMENTS

| DE | 19961374 A1 | 6/2001 |
| EP | 1068931 A2 | 1/2001 |

(Continued)

OTHER PUBLICATIONS

International Search Report and Written Opinion of International Searching Authority dated Jan. 28, 2013 of Applicant's corresponding PCT application.

*Primary Examiner* — Nathaniel Chukwurah  
(74) *Attorney, Agent, or Firm* — Seyfarth Shaw LLP

(57) ABSTRACT

A system, and a method of using a system, for controlled tool operation. The method includes providing a tool used in a force application such as a such torque application. The tool communicates with a controller which can communicate with the tool, and to a display in communication with the tool and the controller. The controller can be programmed with operational information about a tool operation. Information related to the operational information is displayed to a user during use. Service information including at least information about an amount of force applied during use is recorded and stored in the controller. Also disclosed is a computerized system for controlled tool operation which sends operational instructions to the tool before use and retrieves service information from the tool after use.

8 Claims, 33 Drawing Sheets

Related U.S. Application Data continuation of application No. 11/025,225, filed on Dec. 22, 2004, now Pat. No. 7,182,147, which is a continuation of application No. PCT/US03/30263, filed on Sep. 26, 2003, which is a continuation-in-part of application No. PCT/US03/20426, filed on Jun. 27, 2003.

(60) Provisional application No. 60/414,191, filed on Sep. 27, 2002, provisional application No. 60/392,322, filed on Jun. 27, 2002.

(51) Int. Cl.
*B25B 23/142* (2006.01)
*B60B 29/00* (2006.01)

(56) References Cited

U.S. PATENT DOCUMENTS

| | | |
|---|---|---|
| 4,257,263 A | 3/1981 | Herrgen |
| 4,426,887 A | 1/1984 | Reinholm |
| 4,450,727 A | 5/1984 | Reinholm et al. |
| 4,759,225 A | 7/1988 | Reynertson et al. |
| 4,787,136 A | 11/1988 | Majic |
| 5,014,794 A | 5/1991 | Hansson |
| 5,094,301 A | 3/1992 | Wipperman et al. |
| 5,713,250 A | 2/1998 | Hendricks et al. |
| 5,903,462 A | 5/1999 | Wagner et al. |
| 6,263,322 B1 | 7/2001 | Kirkevold et al. |
| 6,348,897 B1 * | 2/2002 | Alameh et al. .............. 343/702 |
| 6,390,205 B2 | 5/2002 | Wallgren et al. |
| 6,405,598 B1 * | 6/2002 | Bareggi .................... 73/761 |
| 6,473,664 B1 | 10/2002 | Lee et al. |
| 6,668,212 B2 | 12/2003 | Colangelo et al. |
| 2002/0029092 A1 | 3/2002 | Gass |
| 2002/0077088 A1 | 6/2002 | Yamanaka et al. |
| 2003/0009262 A1 * | 1/2003 | Colangelo et al. ............. 700/275 |
| 2003/0105599 A1 * | 6/2003 | Fisher et al. .................... 702/41 |
| 2003/0187545 A1 | 10/2003 | Smith et al. |
| 2004/0172800 A1 | 9/2004 | Seith et al. |
| 2005/0205275 A1 | 9/2005 | Kaminski |

FOREIGN PATENT DOCUMENTS

| | | |
|---|---|---|
| WO | WO 02/30624 A2 | 4/2002 |
| WO | WO 03/045635 A1 | 6/2003 |

\* cited by examiner

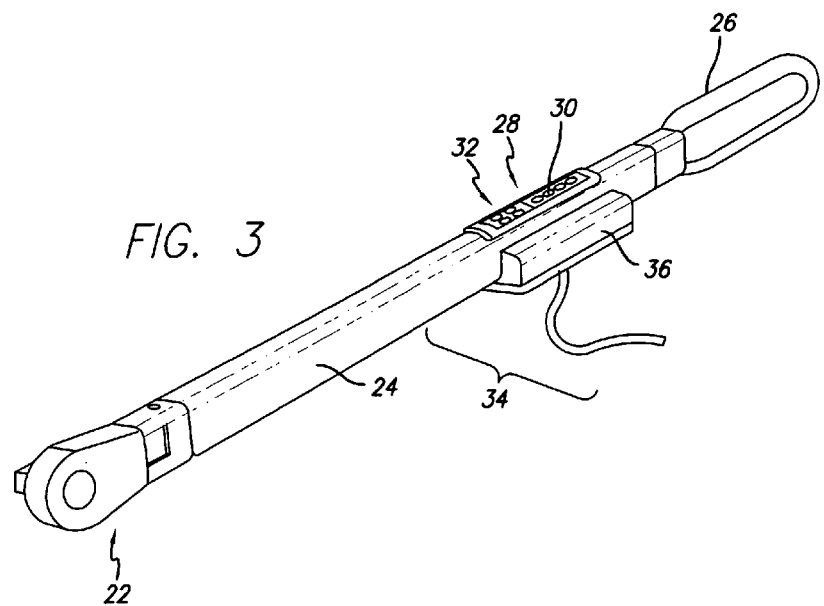
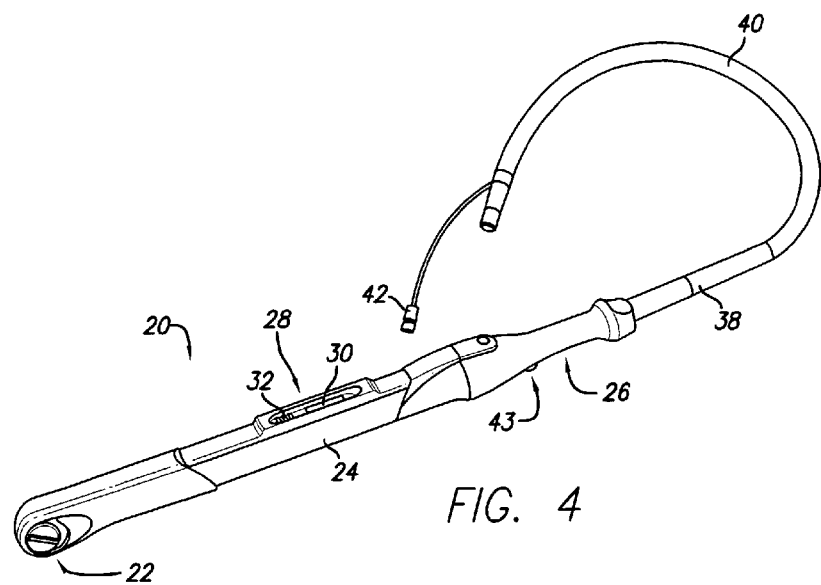

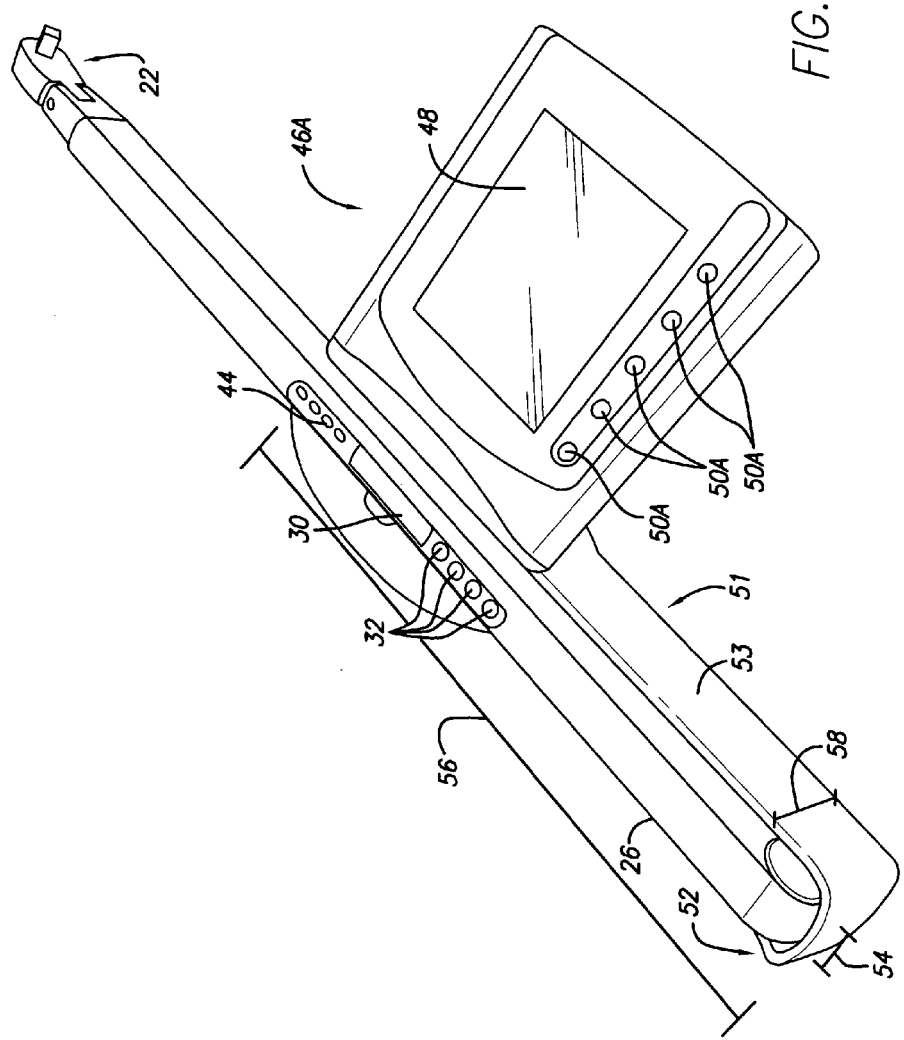

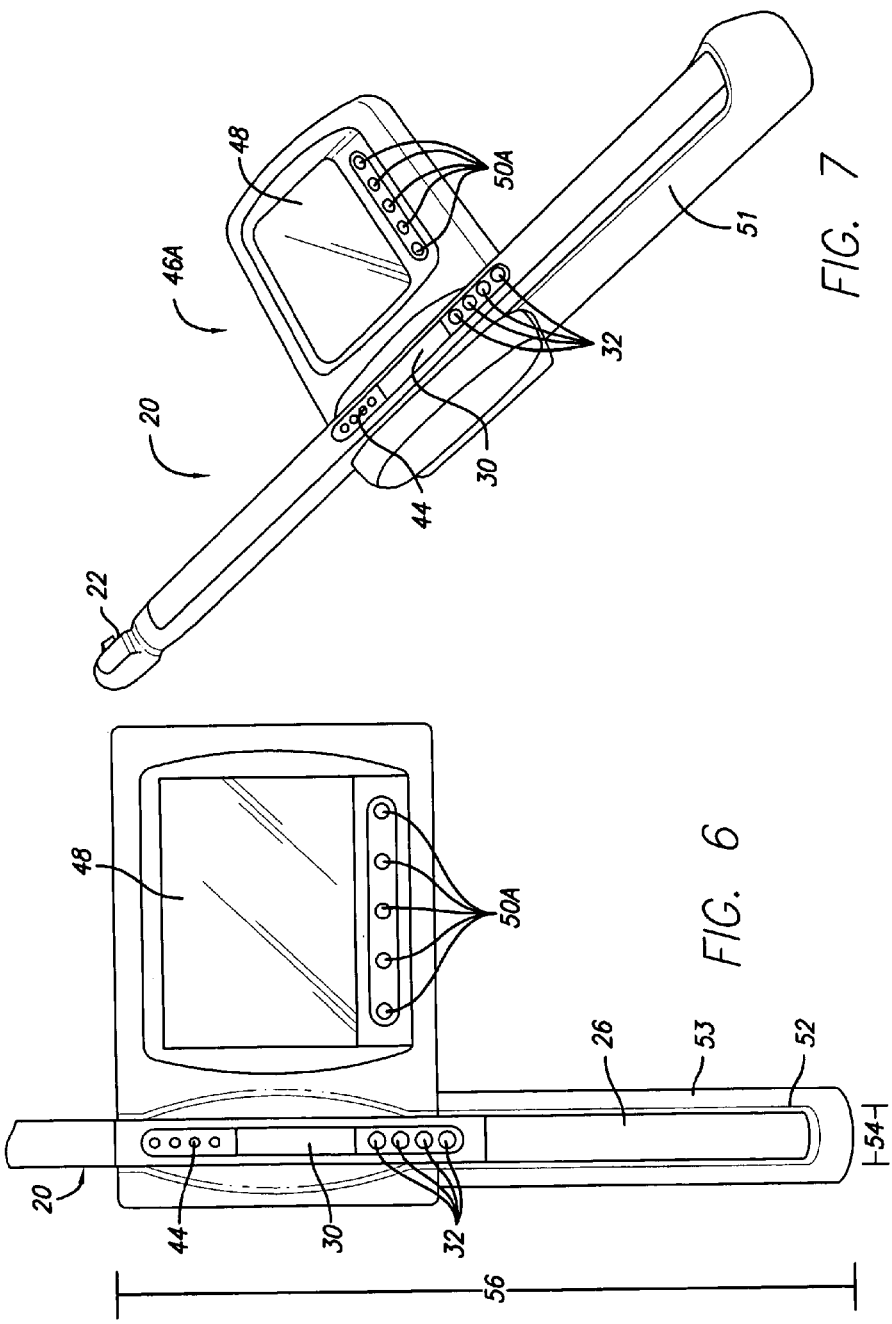

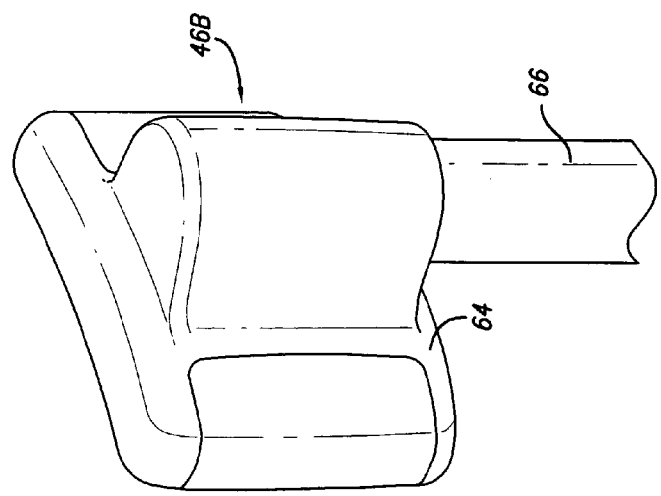
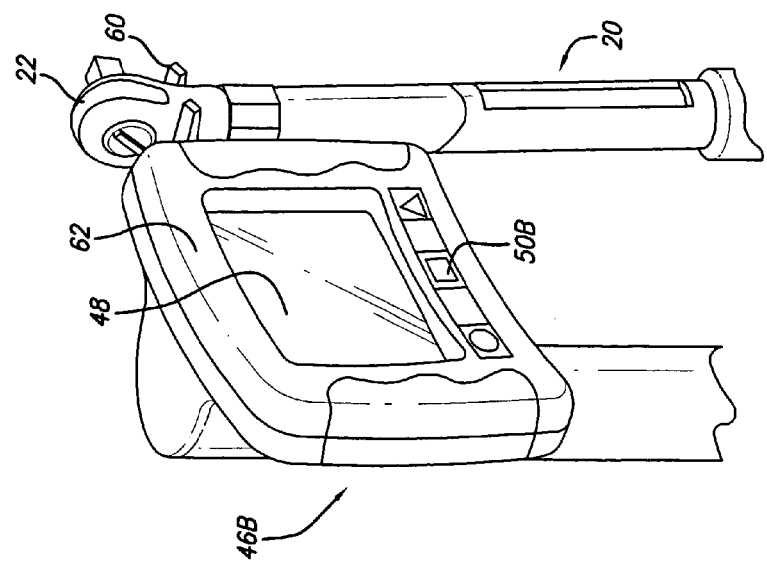

Servicing

| Vehicle | 2000 FORD Taurus |
| License | 4G |
| Torque | 100.0 ft-lb, 19mm Socket |
| Instruct. | 4 New Tires |

|    | 1     | 2     | 3     | 4     | 5     |
|----|-------|-------|-------|-------|-------|
| LF | --    | --    | --    | --    | --    |
| RF | 104.9 | [0.0] | 102.9 | --    | 101.5 |
| RR | --    | --    | --    | --    | --    |
| LR | --    | --    | --    | --    | --    |

Torque: -0.2 / 0.0
Ticks: 21262860

Cancel

Servicing

| Vehicle | 2000 FORD Taurus |
| License | 4G |
| Torque | 100.0 ft-lb, 19mm Socket |
| Instruct. | 4 New Tires |

|    | 1     | 2     | 3     | 4     | 5     |
|----|-------|-------|-------|-------|-------|
| LF | [0.0] | --    | --    | --    | --    |
| RF | 104.9 | 105.5 | 102.9 | 100.9 | 101.5 |
| RR | 103.5 | 1.2.7 | 101.8 | 104.0 | 100.9 |
| LR | --    | --    | --    | --    | --    |

Torque: -0.2 / 0.0
Ticks: 21408086

Cancel

FIG. 40

Servicing

| Vehicle | 2000 FORD Taurus |
| License | 4G |
| Torque | 100.0 ft-lb, 19mm Socket |
| Instruct. | 4 New Tires |

|    | 1     | 2     | 3     | 4     | 5     |
|----|-------|-------|-------|-------|-------|
| LF | 103.7 | 104.0 | 102.5 | 102.8 | 104.2 |
| RF | 104.9 | 105.5 | 102.9 | 100.9 | 101.5 |
| RR | 103.5 | 1.2.7 | 101.8 | 104.0 | 100.9 |
| LR | 101.6 | 101.0 | 100.9 | 101.6 | 100.0 |

Completed ! Accept

Accept 489, 490, 491

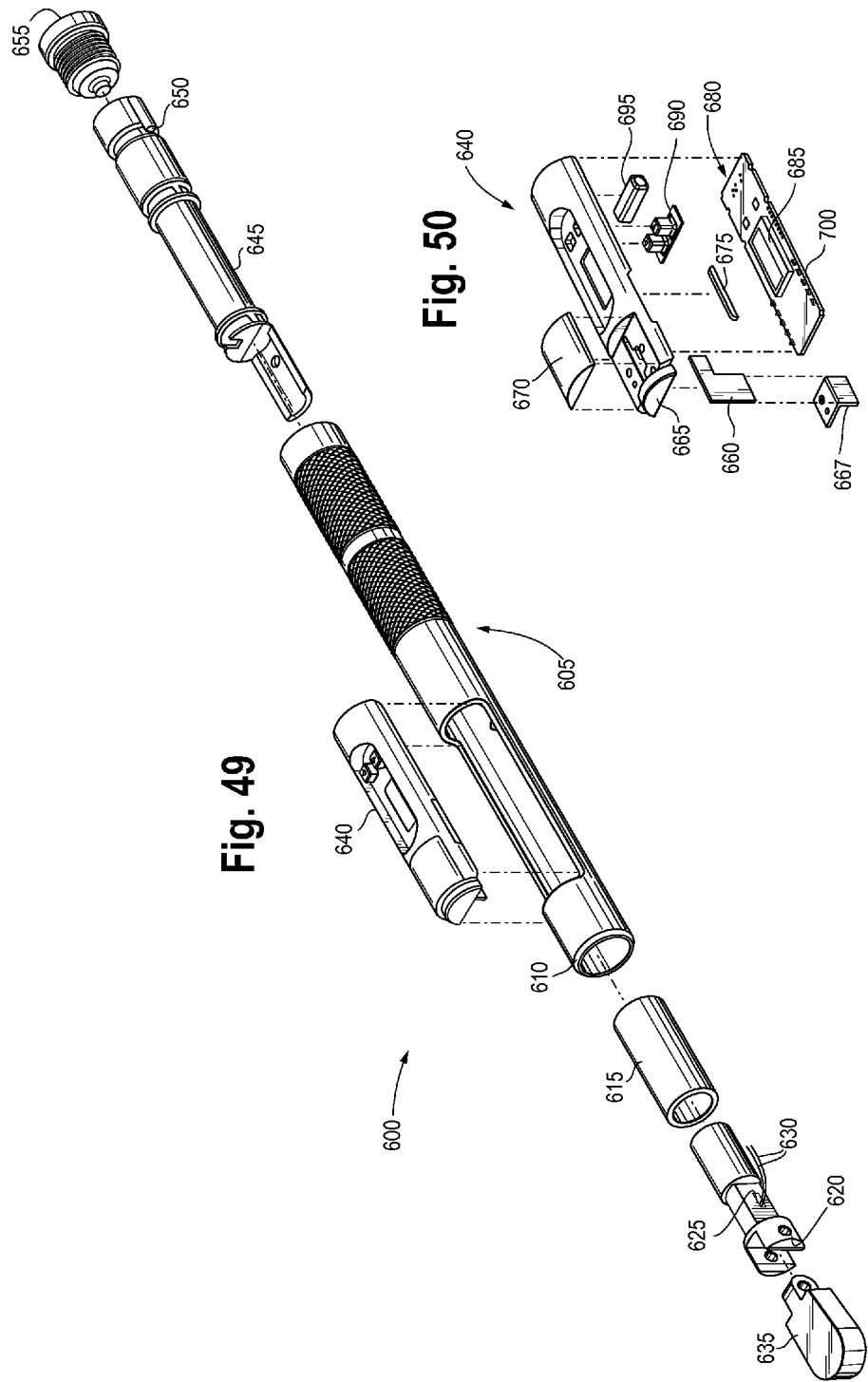

TOOL APPARATUS SYSTEM AND METHOD OF USE

CROSS-REFERENCE TO RELATED APPLICATION(S)

This application is a continuation-in-part of U.S. patent application Ser. No. 13/117,670, filed May 25, 2011; which is a continuation of application Ser. No. 11/679,113, filed, Feb. 26, 2007, now U.S. Pat. No. 7,954,557, which is a continuation of application Ser. No. 11/025,225, filed Dec. 22, 2004, now U.S. Pat. No. 7,182,147, which is a continuation of Application No. PCT/US03/30263, filed Sep. 26, 2003, which is a Continuation-In-Part of PCT/US03/20426, filed Jun. 27, 2003, which claims benefit of Provisional Application No. 60/414,191, filed Sep. 27, 2002 and claims benefit of Provisional Application No. 60,392,322, filed Jun. 27, 2002 and said application Ser. No. 11/025,225, filed Dec. 22, 2004, is a continuation of PCT/US03/30263, filed Sep. 26, 2002 which is a Continuation-In-Part of PCT/US03/20426, filed Jun. 27, 2003, which claims benefit of Provisional Application No. 60/414,191, filed Sep. 27, 2002 and claims benefit of Provisional Application No. 60/392,322, filed Jun. 27, 2002, all foregoing being assigned to the assignee of the present disclosure and all of which are expressly incorporated herein by reference.

BACKGROUND OF THE INVENTION

The present disclosure relates to a tool apparatus, system associated with the apparatus, and method of using the apparatus and the system for use in attaching fasteners and other tool operations. For example, one application of this disclosure would be to provide a tool, system and method for attaching lug nuts to secure a wheel to a vehicle.

By way of background, a fastening system may require tightening components such as a nut and bolt in a threaded fastening system, to a desired force or torque or within a desired torque range. Securing the fastening components at a desired torque setting allows for secure attachment of the components and any structures related thereto without under-tightening or over-tightening the components. Under-tightening the components could result in disengagement of the components. Over-tightening the components could make disengaging the components difficult or could cause damage to the components. To prevent under-tightening or over-tightening a torque measurement can be made while tightening the components, for example, a nut to a bolt, to meet a target torque setting or to apply a torque within a desired torque range.

With reference to a more specific example, a lug nut is attached to a bolt on a vehicle axle to mount the wheel to the vehicle. In this example, a vehicle such as a car may have four or five mounting bolts for mounting the wheel to the car. The wheel fits over the mounting bolts and the lug nuts are attached to the mounting bolts. It is desirable to prevent under-tightening so as to prevent disengagement of the lug nuts from the bolts. It is desirable to prevent over-tightening so that the lug nuts can be disengaged at some time in the future and to prevent damage to the nut and bolt structure such as preventing "stripping" of the threads between the nut and bolt.

SUMMARY OF THE INVENTION

The present disclosure relates to a tool apparatus, system, and method of using the apparatus and system for tightening and standardizing the forces associated with a fastener system and for use in other tool systems. In one embodiment, the system includes access to a database of vehicle configuration information. Information is provided to the tool apparatus. The tool apparatus provides verification of the information and verification of application of the information. After use, the tool assembly transfers the information back to the system to provide a historical record of the event.

In another configuration, the tool assembly includes a coupling device or coupler and a tool. The coupling device receives information from the system and transfers it to the tool. Once the vehicle configuration information is received, the tool is removed from the coupler and is used to establish torque settings for use in the fastener torque process. Verification of the tightening process is recorded at the tool and transmitted back to the coupler. The coupler then transfers the information to the system.

In another configuration, the system includes a shop management server which communicates with a controller. The controller is used to collect information about the subject automobile from the system. The controller delivers the information to the shop management server. The shop management server then delivers corresponding vehicle configuration information to the coupler for transfer to the tool. The tool utilizes the information in the fastener tightening process. Verification of the information can be recorded at the tool and transferred back to the coupler when the tool is placed in the coupler. Information transferred to the coupler can be transmitted to the shop management server for verification, transaction completion and storage.

Other features of the disclosure will be set forth in part in the description which follows and the accompanying drawings, wherein the embodiments of the disclosure are described and shown, and in part will become apparent upon examination of the following detailed description taken in conjunction with the accompanying drawings.

BRIEF DESCRIPTION OF THE DRAWINGS

For the purpose of facilitating an understanding of the subject matter sought to be protected, there are illustrated in the accompanying drawings embodiments thereof, from an inspection of which, when considered in connection with the following description, the subject matter sought to be protected, its construction and operation, and many of its advantages should be readily understood and appreciated.

The detailed description particularly refers to the accompanying figures in which:

FIG. 3 is a perspective view of another embodiment of the tool of FIG. 1, shown seated in a cradle for sending and receiving data;

FIG. 4 is an illustration of pneumatically driven embodiment of a tool used for controlled torque application;

FIG. 5 is a perspective view of a tool similar to that as shown in FIG. 1 in a docking configuration with a controller;

FIG. 6 is top plan view of FIG. 5;

FIG. 7 is side perspective view of FIG. 5;

FIGS. 8A and 8B are illustrations showing a front view and rear view respectively of the tool being carried on another embodiment of the controller;

FIG. 33 is a screen display of a completed car selection dialog box;

FIG. 34 is a screen display showing information about the vehicle transferred thereto;

FIGS. 38-39 are progressions of FIG. 37 during servicing;

FIG. 40 is a display screen on the control unit at the completion of service;

FIG. 41 is the interface of FIG. 19 showing data from a selected repair operation;

FIG. 42 is the interface of FIG. 41 after a "show closed work orders" checkbox has been completed;

FIG. 49 is an exploded view of the tool illustrated in FIG. 48.

FIG. 50 is an exploded view of the bezel assembly.

DETAILED DESCRIPTION OF PREFERRED EMBODIMENTS

Figure 1:
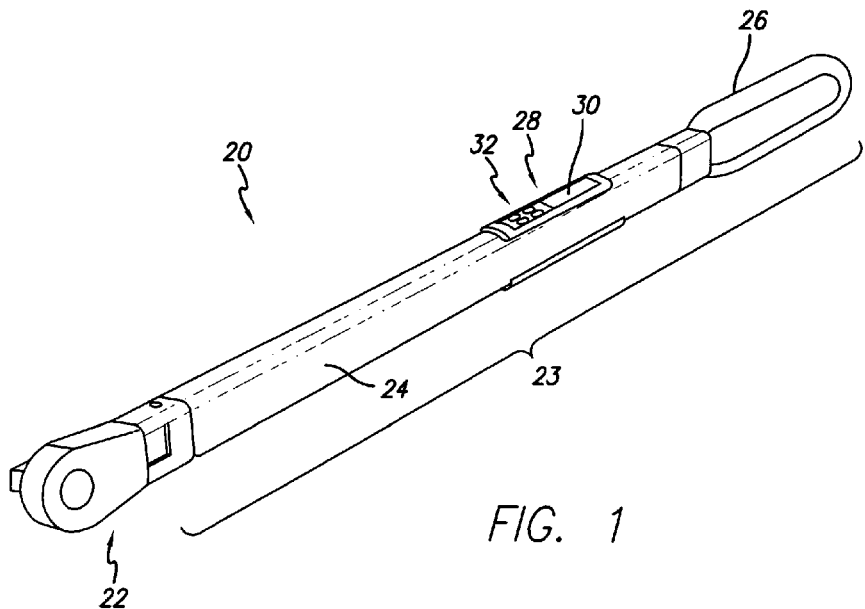
FIG. 1 is a perspective view of one embodiment of a tool used for a controlled tool operation.

While the concepts of the present disclosure will be illustrated and described in detail in the drawings and description, such an illustration and description is to be considered as exemplary and not restrictive in character, it being understood that only the illustrative embodiments are shown and described and that all changes and modifications that come within the spirit of the disclosure are desired to be protected. There are a plurality of advantages that may be inferred from the present disclosure arising from the various features of the apparatus, systems, and methods described herein. It will be noted that alternative embodiments of each of the apparatus, systems, and methods of the present disclosure may not include all of the features described yet still benefit from at least some of the inferred advantages of such features. Those of ordinary skill in the art may readily devise their own implementations of an apparatus, system, and method that incorporate one or more of the features of the present disclosure and fall within the spirit and scope of the disclosure as defined by the appended claims.

As shown in FIG. 1, a tool 20 for controlled or otherwise guided application of torque is shown in the form of a manual or pneumatic torque wrench. Although a torque wrench embodiment is shown, the present disclosure is meant to broadly cover any tool used for torque applications including but not limited to torque wrenches, torque screwdrivers, adjustable click-type torque instruments, torque reading instruments, torque drivers, open head torque wrenches, ratchets, torque calibrators, and torque measurement acquisition systems. Further, this disclosure is intended to broadly include all tools which can be configured for use in the method and system as disclosed.

In the embodiment shown, the tool 20 includes a driver shown in the form of a drive head 22, and a handle 23, which includes a shaft 24, and a grip 26. Although FIG. 1 shows grip 26 at the end of handle 23, the grip may be positioned at other locations along the handle 23, or alternatively, the handle 23 may be fitted with two or more grips for gripping. Tool 20 further includes a controller 28 operatively associated with the tool, such as shown being seated in or fixedly attached to handle 23.

Preferably, controller 28 includes a display 30 for displaying information related to a torque application to be described more fully hereinafter. Controller 28 also includes one or more control buttons 32 for inputting commands or interacting with menus presented on display 30. The controller 28 also has circuitry of known construction to sense and record a magnitude of torque applied by the tool 20 during a particular torque application. The controller 28 has volatile or re-writeable memory for storing recorded torque magnitude for later retrieval and/or transmission to other devices.

Figure 2:
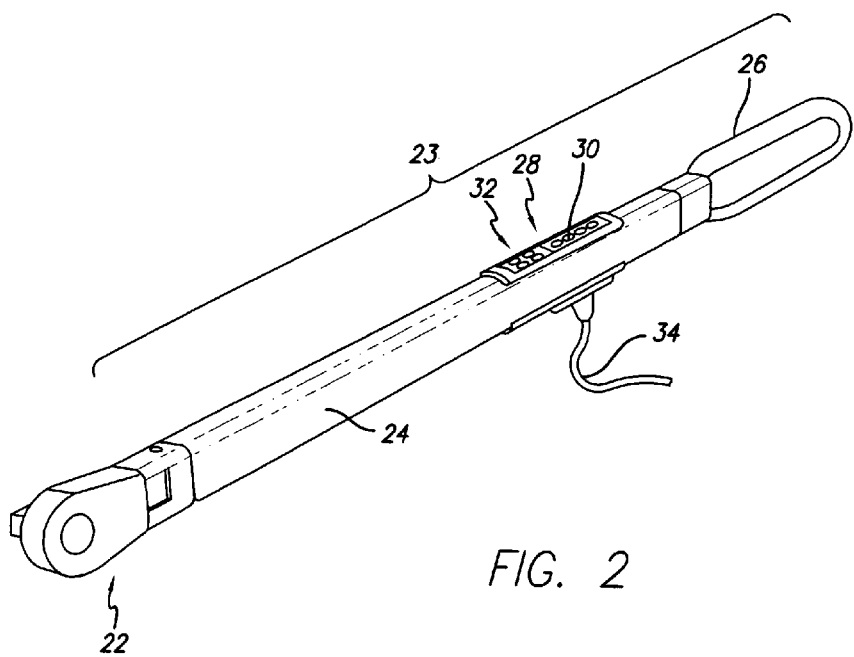
FIG. 2 is a perspective view of another embodiment of the tool of FIG. 1, showing a cable attachment for sending and receiving data.

Referring to FIG. 2, in applications that require the tool 28 to communicate with outside devices such as a shop management system or control unit to be described hereinafter, the controller 28 also includes an input/output connection or port for communicating with such devices over a communications path 34. As illustrated, the communications path may be a hard wire connection, such as an insulated copper wire or optical fiber, although it should be understood that communication paths 34 can also be a wireless communication paths such as infrared, acoustic, RF or other wireless communication techniques. The tool also can be embodied to be coupled with a cradle 36 as shown in FIG. 3 with cradle 36 and attached wired or wireless technology acting as communications path 34. In such an embodiment, controller 28 includes a port or junction (not shown) of known construction for being removably electronically connected to cradle 36.

Referring now to FIG. 4, tool 20 may be hand powered during use or may have an attachment for being pneumatically, electrically, hydraulically or magnetically powered. The attachment interfaces with a power drive (now shown) used to provide controllable power driving for the drive head 22. As shown in FIG. 4 pneumatic line 38 is shown for connecting tool 20 to a pneumatic power source via a hose 40 and a pneumatic source coupling 42. Pneumatic pressure can be activated using trigger 43. Although a variety of pneumatic pressures may be used depending on the intended torque application, a suitable range for many applications such as vehicle tire lug nut removal and/or refastening is between 85 and 120 psi line pressure at 3.0 CFM minimum air supply.

As shown in FIG. 5, tool 20 can be configured to mate with a control unit 46A. FIG. 5 also shows tool 20 including a sensory response device or alert indicator 44 in the form of four lights seated in handle 23 and electronically controlled by controller 28. Although visual alert indicators are shown, the alert indicator 44 may also be an auditory device for making an auditory signal, or may be a device for creating tactile sensation such as a vibration, heating, or cooling. Alert indicator 44 may also be some combination of auditory, visual, or tactile device. Although one possible positioning for alert indicator 46 is shown, other locations such as at the end or underside of the handle 33 are suitable as well.

Control unit 46A is configured to communicate with tool 20 when tool 20 is docked therein. Control unit 46A include control unit display 48, control unit buttons 50A used for inputting commands and interfacing with menus presented on display 48, and docking section 51. During docking, tool 20 is inserted in docking cavity 52 defined by the upright docking section wall 53 and having a width dimension 54, a length dimension 56, and a depth dimension 58 which are slightly larger than a corresponding length, width, and depth of handle 23 to allow removably secure positioning of tool 20 within the docking cavity 52. A coupling or junction (not shown) is also provided along an interior wall of docking cavity 52 for electrically connecting control unit 46A to controller 28. A top plan view and side perspective view of tool 20 docked in control unit 46A are shown in FIG. 6 and FIG. 7, respectively.

Figure 9B:
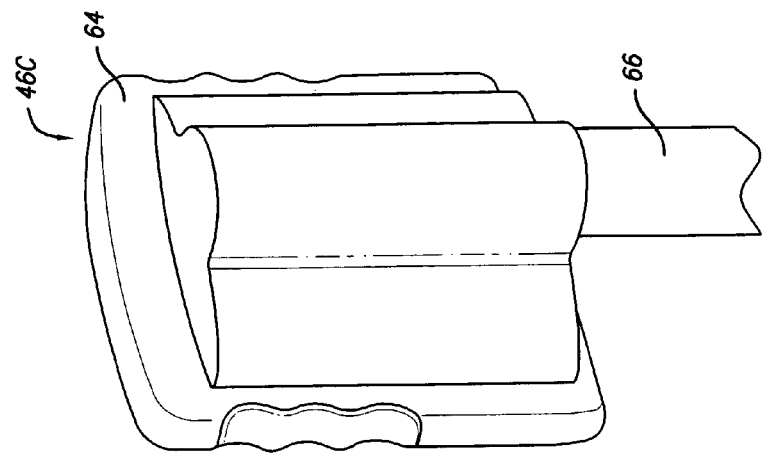
FIGS. 9A and 9B are illustrations showing a front view and rear view respectively of another embodiment of the controller supporting the tool.
Figure 9A:
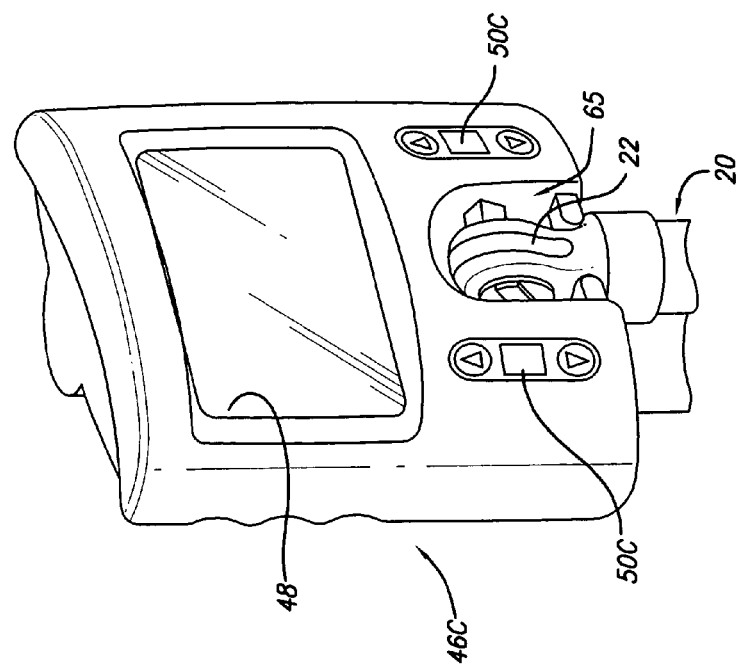

An alternative embodiment of control unit 46B is shown in FIG. 8A and FIG. 8B. In this embodiment, tool 29 docks by hanging on support or hanger 60. Connection between the control unit 46B and tool 20 may be through hanger 60 or via wireless communication when control unit 46B and tool 20 are brought in close proximity. FIG. 9 shows another embodiment of a control unit 46C in which the drive head 22 is inserted or clicked into a hanging docking cavity 65. Control unit 46 is elevated from the floor or other support platform by pole or support 66.

Figure 10:
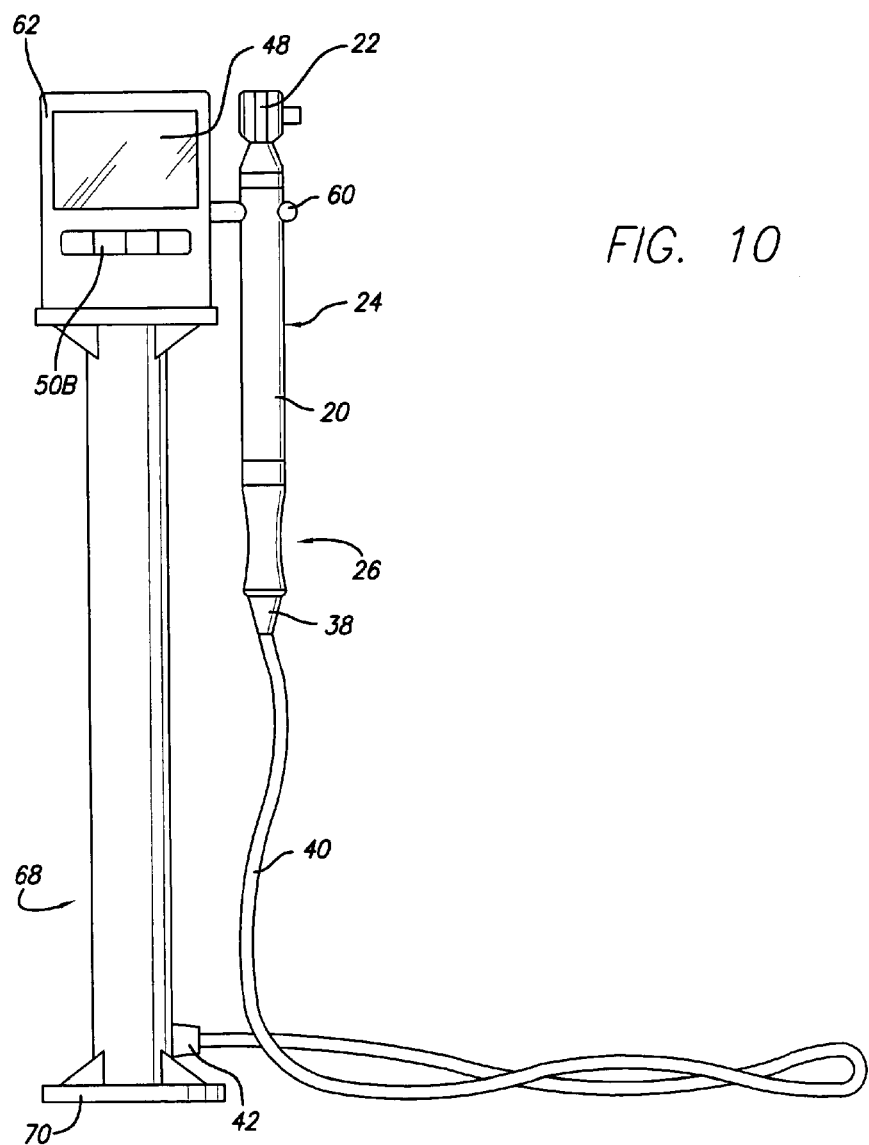
FIG. 10 is an illustration showing a front elevation view of a pneumatically powered embodiment of the tool carried on the controller positioned in a vertical stand.

FIG. 10 shows a front view of the control unit 46B with tool 20 docked therein. This embodiment also shows the positioning of the pneumatic line 38, hose 40, and pneumatic source coupling 42. Stand 68 may connected to or house a pneumatic pressure system for supplying pneumatic pressure to tool 20. To secure or balance stand 68, a floor plate 70 may be fixedly attached to the floor or other support platform.

Control units may also be commonly available portable digital assistants or PDA such as those available from Palm, or other mobile computing devices. Software configured to communicate with tool 20 may be loaded onto the PDA which can use operating systems such as Palm OS, Microsoft Windows CE, or other mobile computing device operating systems presently available or hereafter devised. The communications and operations protocols used by the tool may also be written in HTML or XML programming language, or other suitable systems presently available or hereafter devised for interoperability with a wide range of software and hardware platforms.

The control unit 46 as illustrated, can be in the form of an Ethernet cradle which is similar to the cradle bundled with most hand held devices. However, such an Ethernet cradle may be designed to include a Ethernet card and an RJ-45 connector. This connector allows the unit to connect to a local area network via a CAT5 cable attached to a hub or switch. This will allow for rapid communication (10 Mbps, 100 MBps, or gigabit) between the tool 20 and a shop management system 100.

Figure 11:
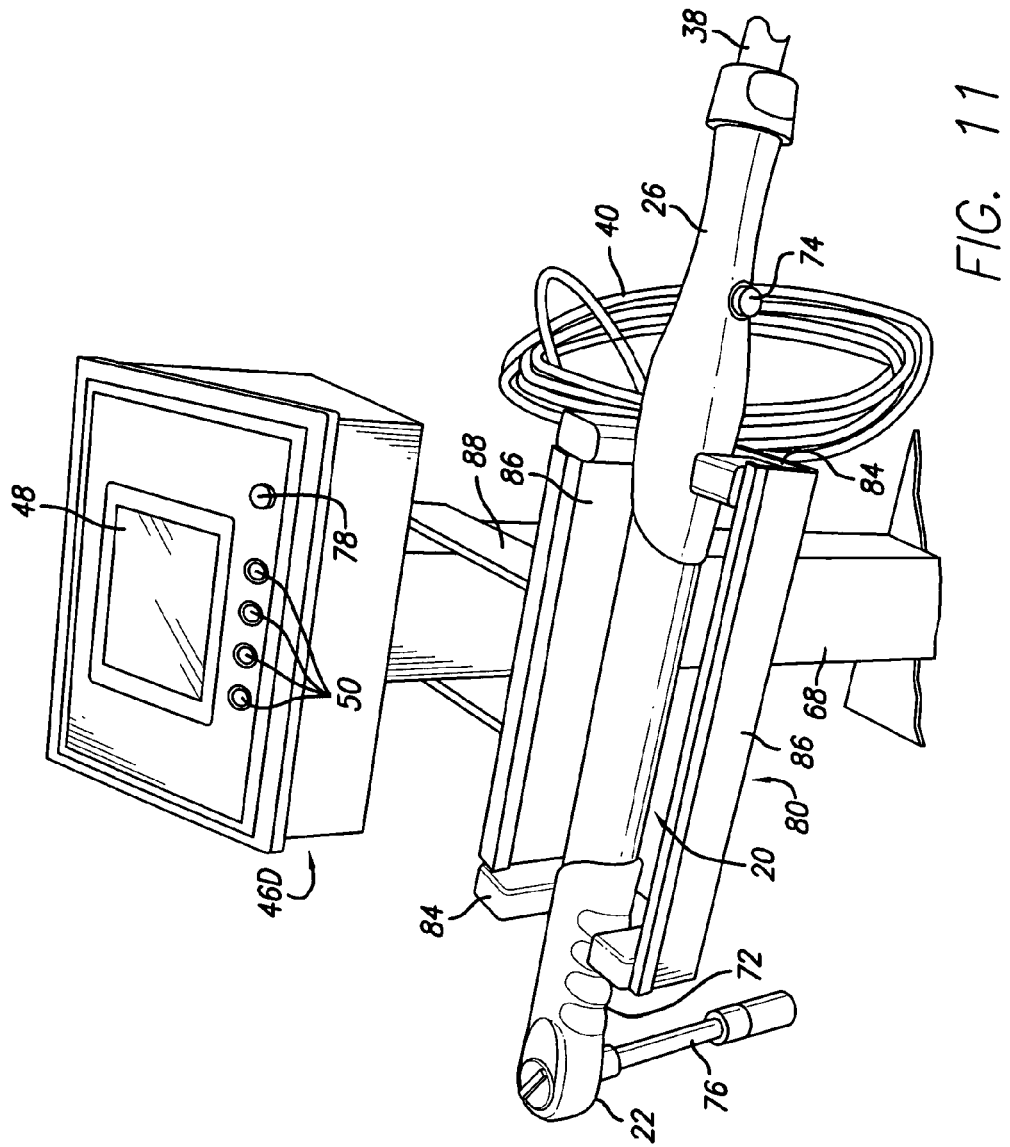
FIG. 11 is an illustration of a pneumatically powered embodiment of the tool positioned on a support structure attached to another embodiment of the controller.

FIG. 11 shows another embodiment of the control unit 46D with tool 20 docked therein. The embodiment of tool 20 shown in FIG. 11 includes a second grip 72 and extension member 76 attached to drive head 22. Control unit 46D is relatively larger than previously discussed control units and is intended to remain fixed during use. A power button 78 is shown for toggling the control unit 46D on and off. The docking structure shown for control unit 46D is a support platform 80 including two U-shaped portions 84 connected by lateral sides 86. Tool 22 lays horizontally on the support platform 80 within the interior of the U-shaped end portions 84. Support platform 80 is connected to the stand 68 by horizontal extension member 88.

Figure 47:
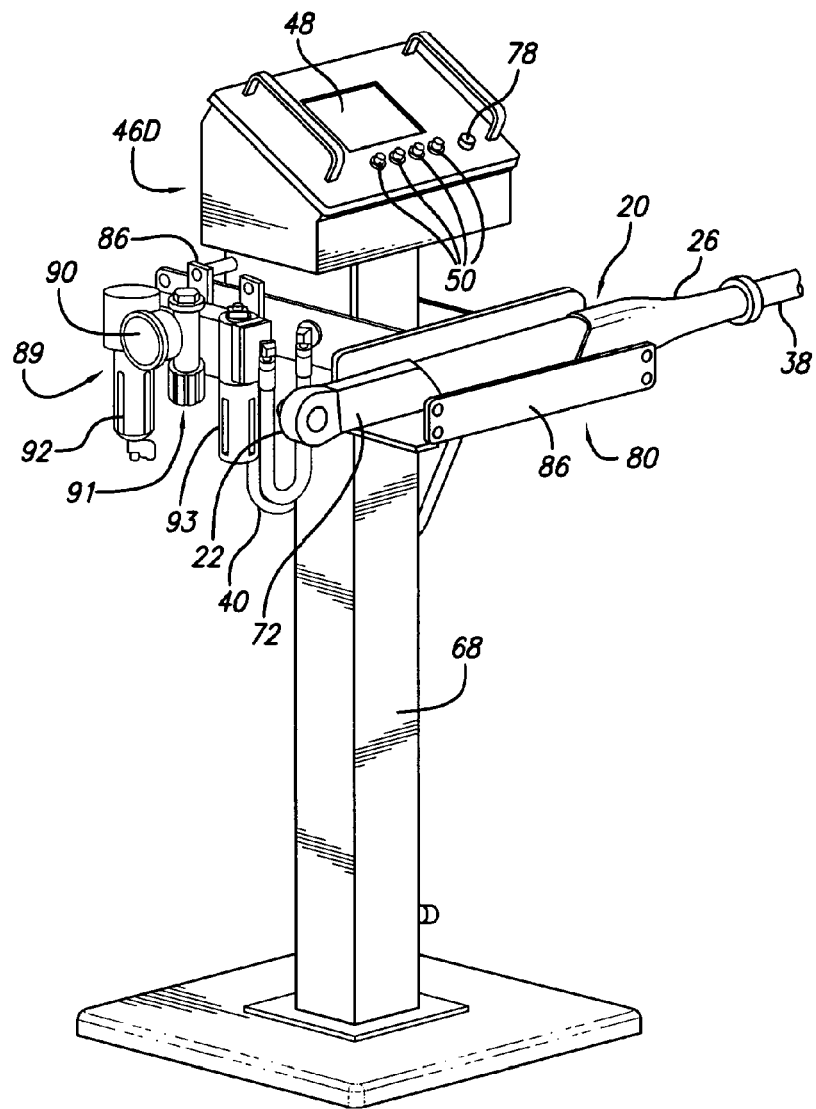
FIG. 47 is another embodiment of the tool of FIG. 11.

FIG. 47 is another view of the control unit 46D showing a pneumatic or hydraulic pressure system 89 including gauge 90, valve apparatus 91, and chambers 92, 93 in communication with valve apparatus 91 fixedly mounted to stand 68. Pressure system 89 may be constructed from any pressure delivery system known in the industry suitable for providing pressures needed for the applications described herein.

Figure 12:
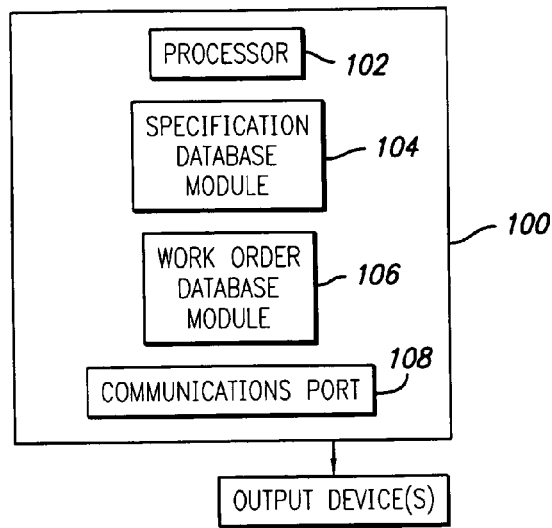
FIG. 12 is a simplified diagrammatic view of a shop management system.
Figure 13:
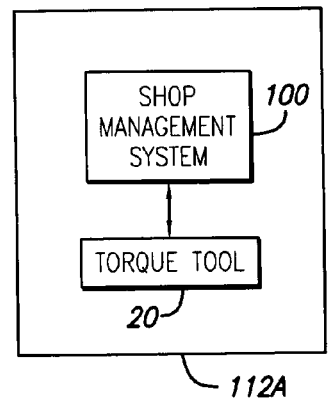
FIG. 13 is a simplified diagrammatic view of a torque monitoring system including shop management system and a torque tool.

FIG. 12 is a simplified diagrammatic view of a shop management system 100. Shop management system 100 can be configured on a general purpose computer that includes a processor 102, a specification database module 104 accessible by or loaded onto the system 100, a work order database module 106 accessible by or loaded onto system 100, and a communications port 108. The modules 104, 106 can be accessed by the processor locally or remotely over a communications network such as a local area network, wide area network, over an intranet, or over the Internet or another suitable communications hereafter devised and usable for this system. Shop management system 100 will also include both dynamic memory such as RAM and a storage device such as a hard drive or the like. The term "module" referenced in this disclosure is meant to broadly cover various types of software code including but not limited to routines, functions, objects, libraries, classes, members, packages, procedures, methods, or lines of code together performing similar functionality to these types of coding, therefore one program can operate to provides the functionality, or the functionality can be divided over a number of programs, accessible either locally or remotely. The system 100 may also communicate with one or more output devices 110 such as monitors or printers. For the purposes of the present example, and as illustrated in figures, the database modules 104, 106 will be loaded on the shop management system 100.

Figure 14:
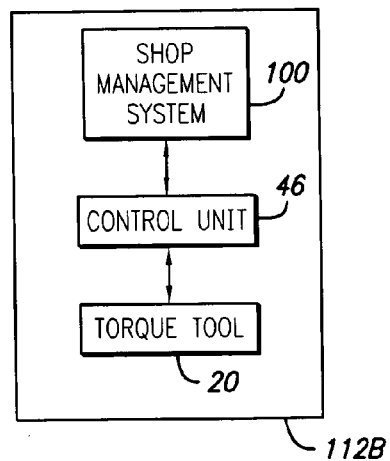
FIG. 14 is a simplified diagrammatic view of another embodiment of the torque monitoring system.
Figure 15:
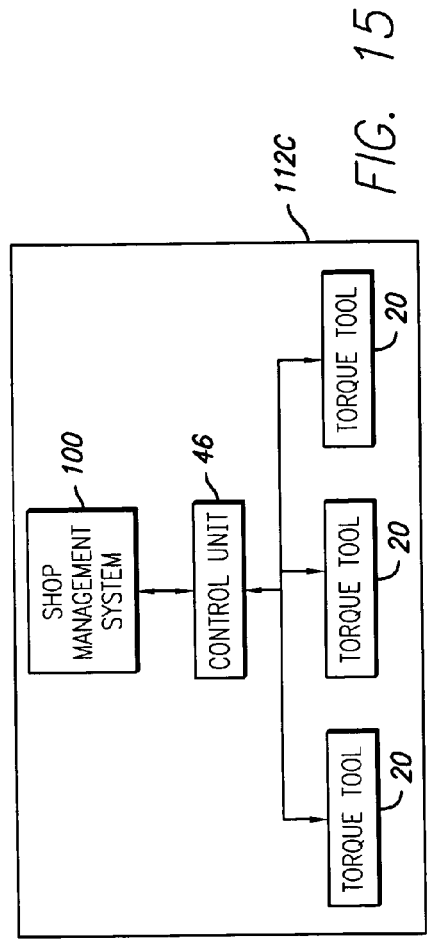
FIG. 15 is a simplified diagrammatic view of another embodiment of the torque monitoring system for managing multiple torque tools.
Figure 16:
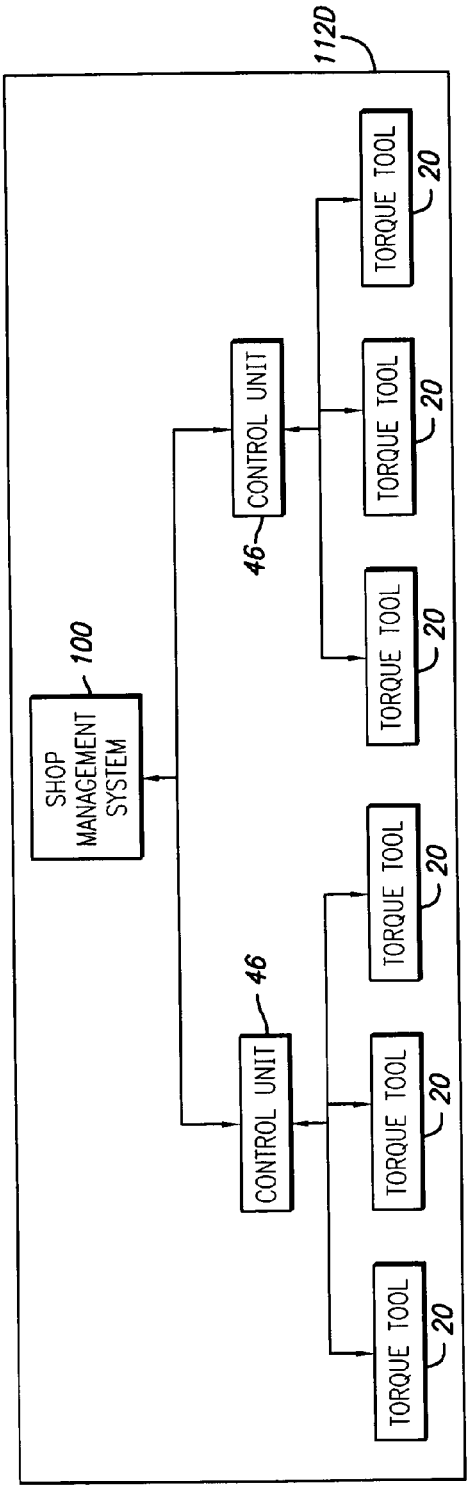
FIG. 16 is a simplified diagrammatic view of another embodiment of the torque monitoring system for managing multiple torque tools and multiple control units.

As shown in FIGS. 13-16, shop management system 100 can communicate directly with tool 20. System 100 and tool 20 make up torque management system 112A. This connection may be via a hardwire or wireless using any of the communications protocols previously described. In the alternative, as shown in FIG. 14, the control unit 46, or alternatives embodiments 46A, 46B, 46C, 46D thereof, can also be used an intermediate interface between shop management system 100 and tool 20 these three components defining an another torque management system 112B. As shown in FIG. 15, the control unit 46 can also be used to control more than one tool 20 the group of which define torque management system 112C. Recall that tool 20 removably docks with control unit 46 so one tool can be removed and another connected so that one control unit 46 can be used to communicate with more than one tool 20. As shown in FIG. 16, shop management system 100 can be used to communicate with more than one control unit 46 which in turn can be used to communicate with one or more tools 20. The control units can be within the same location or at different locations from the shop management system 100. The combination of the shop management system 100, multiple control units 46, and multiple tools 20 make up torque management system 112D.

Figure 17:
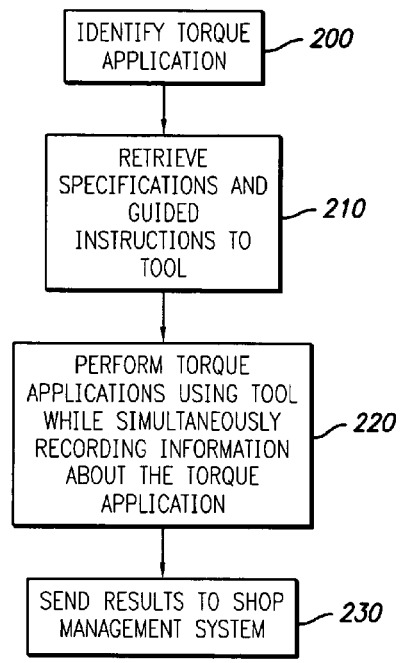
FIG. 17 is a simplified diagrammatic view of a method of using a torque monitoring system.

FIG. 17, shows the general steps by which tool operation or torque management system 112A-D is used. In a first step 200, a particular tool operation, for purposes of illustration, a torque application can be identified. A torque application can be any task or process that requires the use of a torque tool where precise tolerances, a desired range, or limits of the magnitude of the torque applied need to be monitored. Generally, a fastening or unfastening of a fastener to a member can be a torque application. One specific example of a torque application is related to changing a tire on a vehicle. In this example, a number of lug nuts need to be removed, then tire is then replaced, and in turn the lug nuts are refastened to secure a replacement tire. It is known in the automobile industry that each vehicle manufacturer offers specifications for a recommended and maximum safe amount of torque that should be applied to securely fasten lug nuts for that vehicle. While the lug nuts could be manually removed, the tool is used to at least attach the lug nuts to a desired torque range.

In step 200, the torque application such as a lug nut replacement is made to the system 100, the tool 20, or the control unit 46. That identification can be made in a number of different ways. For example, vehicle criteria or identification information such as a particular vehicle make, model, model year, as well as VIN or serial number, bar code scanning, or other identification means, can be input. The system 100 references the specifications database module 106 to find corresponding manufacturer's specifications for the identified torque application. Alternatively, a tire type can be identified. In another embodiment, a torque application code can be entered. In yet another embodiment, the vehicle can be fitted with a device to identify itself to the system 100. The identification can be made to the tool 20, system 100, or control unit 46 by any input method or device including using a keyboard, interacting with a graphical user interface that has menus or other selection protocols, scanning a barcode from a printed work order, or from import/export or other communication with work order or job database, such as a work order database used in a vehicle repair facility.

In a second step 210, the manufacturer's specifications for the identified torque application are retrieved and transmitted to the tool. If the system 100 referenced the specification database in step 200, then the specifications are transmitted from the system 100 to the tool 20 via a communications path 34 therebetween. Alternatively, the system 100 sends the specifications to the control unit 46 which in turn transmits the specifications to the tool 20 when the tool 20 is docked therein. If the specifications are already on tool 20, for example because the same torque application was performed prior to the current torque application, the specification can be recalled from the tool's 20 memory. Similarly, if the specifications are already resident on the control unit 46, the specifications can be recalled and loaded onto tool 20.

In a third step 220, a user or operator, such as, for example, a mechanic or technician, uses the tool loaded with the torque application specifications to perform the torque application. The tool 20 or the tool 20-control unit 46 combination are configured to guide the user through the torque application. This guidance can come in the form of specifying a particular portion of the application and displaying a maximum allowable applied torque. The torque magnitudes displayed can be in either U.S. customary units (lbs-ft) or in S.I. units (N-m).

The guidance can also come in the form of producing an alert during torque application to notify the user that the user is approaching or has exceeded a specification. For example, if the application is re-securing lug nuts after a tire replacement, in an embodiment where the alert indicator 44 is a series of three lights, one light yellow, the second light green, and the third light red, the controller 28 may cause the yellow light to be illuminated as the desired torque is being approached, the green light to be illuminated when the desired torque is reached, and the red light to be illuminated to indicate an over torque condition.

Similarly, an audible alert indicator 44 embodiment may use different tones for an approaching limit, at limit, or over-limit condition. In yet another embodiment, the alert indicator 44 may take the form of vibration device or other tactile device vibrates at different rates or otherwise variably signals to indicate different torque conditions. The user, when being alerted by the alert indicator that the desired torque has been reached, discontinues the torque application, such as by no longer hand-actuating the tool 20 or by releasing the trigger 43 of a powered version of the tool 20, such as by pneumatics, hydraulics, electrical or magnetic.

Figure 18A:
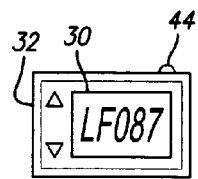
FIG. 18A-18D is a simplified illustration showing a display progression of one version of the tool display screens which are displayed during a torque application.
Figure 18B:
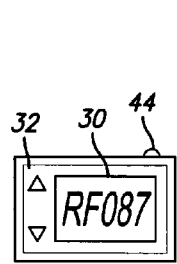
Figure 18C:
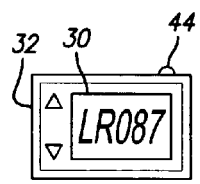
Figure 18D:
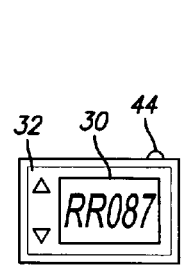

The guidance may also come in the form of directing the user to a particular part, such as a particular tire on a vehicle. The user may then use the controls 32 to indicate that the user is about to perform a torque application on that particular part. As shown FIGS. 18A-D, the display 30 on the tool can display a tire location such as the left front tire using an abbreviated code such as LF followed by the amount of torque to be applied to fasten lug nuts for that tire, in this example 87 ft·lbs. the user can use the controls 32, in the form of up-down buttons in this illustration to cycle between tires and/or to confirm that the selected tire torque task has been completed. FIGS. 18B-D show the display for the right front, left rear, and right rear tires respectively. Other abbreviations and other types of display protocols can be used as well, depending on the nature of the intended torque applications. In this manner, the user is stepped through each part of the torque application process.

Generally simultaneously with the guidance process described above and the various steps of the torque application, a torque sensing device within the controller 28 measures or captures data corresponding to the actual torque applied for that application. That information or data is stored in tool 20 or in a fourth step 230 immediately transmitted back to the control unit 46 or directly to the shop management system 100. The data is used to create a record of exactly how much torque was applied during the various stages of the torque application. In an embodiment where the data is not immediately transmitted from the tool 20, the data can be retrieved and sent to the control unit 46 and system 100 during docking.

The specifications and other torque-related information in the specifications database module 104 can be compiled from promulgated industry standards or from specifications released by original equipment manufacturers. For example, factory torque specifications developed by the automobile manufacturer relating to the proper torque for tightening the lug nuts on the bolts of the wheel can be maintained in the database 104. The information can be modified, updated and corrected as necessary. If this system 100 is connected to a network that has access to updated specifications, this information update can occur at generally any time of the day.

In order to maintain system integrity and security, the various steps described above may include password system implementation or user authentication for added security and user accountability. For example, a technician or mechanic performing a torque application may have to enter a worker ID. As another example, specifications updates to the specification database module 104 may require manager level access.

EXAMPLE 1

Vehicle Repair Center

One embodiment of the system 112 is used by the tire and wheel industry to be used in the installation of automotive wheel lug nuts. This torque management system 112 provides the user with a hand operated electronic torque measuring tool 20 with a torque limited pneumatic driven power ratchet. The user is provided with an ability to retrieve and retain required lug nut torque values from a torque value database (one embodiment of the specifications database module 104) developed to original equipment manufacturers specifications.

A service representative of the tire and wheel industry facility inputs the programmed torque settings from the database. These settings are programmable to OEM or user defined torque settings. The system is advantageous for such uses because minimum technical knowledge of torque application is required by a technician to successfully apply the required torque and record torque data.

The system will reduce the possibility of the technician applying torque levels inconsistent with the torque specifications by requiring the technician to only perform the sequential steps to tighten the wheel lugs, and monitoring the applied torque to each lug nut, guiding the technician to the final applied torque, and noting if an over or under torque event occurs.

During the torque application, the technician may receive visual, audible, and tactile indicators when the programmed torque value is achieved or nearing specification tolerances. The system 112 monitors torque applied by the technician to ensure the defined specified torque has been applied to each lug nut. The defined torque setting must be properly applied before the system 112 will accept data from the next nut or wheel assembly. OEM specifications are defined as a database 104 and interfaced, or included within a shop management system.

User defined torque settings can be input by qualified and/or authorized individuals. Torque values applied to each lug nut are recorded. Recorded torque value data is sent to the host computer for record retention and customer sales order documentation. Further, the system can be configured to prevent release of the vehicle when the tool is docked or if the torque values stored on the tool are outside of the desired torque range.

In this embodiment, the accuracy of the actual applied torque at the interface of the head of the tool and the wheel socket is +/−3% of the applied torque.

The torque tool 20 has an air powered assist ratchet for the removal and seating of the wheel lug nuts prior to the manual application of the final torque to complete the tightening of the lug nut. The air ratchet is based on currently available air ratchet assemblies of known construction. The air ratchet is used to run the lug nut on and off the wheel stud. The air ratchet is design to purposefully not have sufficient power to be used in the breaking free of the lug nut for removal. The air ratchet used in the installation of the lug nut only has sufficient power to apply torque to seat the lug nut, but does not have sufficient power to reach the final required torque specification for the lug nut.

Construction of the hand held air ratchet/torque wrench tool is consistent with industry practice for air powered tools, and will be designed for the intended use and environment as represented as typical to a tire service centers. In this embodiment, the specifications for the tool 20 are as follows: the maximum torque capability applied through the air ratchet will be limited to an output of 50 ft·lbs. at 120 psi supplied line pressure. The level of torque output will be proportional to the supplied air pressure. The maximum achievable torque, at the defined line pressure, is at the point the ratchet stalls with no further rotation in the selected direction. The compressed air requirements for the ratchet require operation within a range of 85 to 120 psi. line pressure @3.0 CFM minimum air supply.

In use, the user has the ability to apply accurate torque with the tool shown in the form of a wrench. Final tightening is only performed through manually applied force and is electronically sensed and indicated to the user. The applied torque is displayed to the user by an LCD display in the tool 20 or control unit 46 indicating the target torque setting and the increasing torque values as force is applied. The display indicates the maximum torque achieved after the applied force is removed by the user.

The tool can provide one or more of the following alert indicators. When the preset torque setting is achieved from force applied to the wrench by the user the wrench provides a visual indicator. The indicator is in the form of an LED display of lights, advancing from one to three yellow torque approach indicators, a green indicator light for reaching the target torque value, and a red indicator light indicating an over torque condition.

A second type of indicator is a tactile indicator. A tactile indicator form of vibration is used to indicate the preset torque value has been achieved and signals the user to release the force being applied to the wrench.

A third type of indicator is an audible torque set point indicator. An audible indicator is provided to indicate to the user that the preset torque value has been achieved, signaling the user to release the force being applied to the wrench.

The tool is equipped with an audio-visual feedback on the display in the event of error conditions.

In this embodiment, the power ratchet head is a standard ½" square drive. The ratchet assembly operates under power in the clockwise and counterclockwise directions. The power driven ratchet has the capacity to sustain repeated torque loads up to 250 ft·lbs. and meet ASME Specification B 107.10-1996 for cyclical loading. The air ratchet/torque wrench can be protected from significant damage in the event that the tool is dropped from a height not exceeding three (3) feet above the shop flooring.

The tool can be covered in a protective synthetic rubber covering to assist in absorbing impact to the tool if dropped or impacted. The tool will resist the force required to break free lug nuts without damage if the required torque at the ratchet head does not exceed 250 ft·lbs. The tool will function normally in temperatures between 45 and 120 degrees F. and humidity below 95%.

The handgrip is designed to allow comfortable grasping of the tool in the right hand. The size will support the palm for application of force to achieve the desired torque. The composition of the grip is synthetic rubber to provide a tactile slip resistant grip. The trigger or button used to control the on/off air supply to the ratchet is located within easy finger reach on the handgrip. The trigger will be located as not to interfere with the hand application of force to achieve the desired torque on the lug nut.

In this embodiment, the wrench is provided with a secondary handgrip to be used to balance the tool and assist in positioning the wrench at the lug nut. The secondary grip is located immediately below to the ratchet head of the wrench. The length of the wrench will be established to provide sufficient leverage to apply manual downward force to achieve the necessary preset torque value per ASME Specification B 107.14-1994.

The control unit 46 for this embodiment provides an interface to the tool 20. An RS-485 interface that is capable of transmitting data up to several hundred feet at up to 1 megabits per second is used for communication purposes. An umbilical assembly with the RS-485 cable connection combined with the air supply line to the hand tool is used. The host computer can fully control the control unit via a two-way communication link.

The host computer formats the work order data, searches a database for the torque limits and forwards relevant data to an available control unit upon request by the control unit. The control unit then indicates that it has work such as by illuminating an LED and displaying a message on the LCD display. In the event there is no available information in the database, an override mode is offered. A service representative can also select the override mode manually. The override mode allows the service representative to enter and confirm torque settings and other important parameters into the control unit. For safety and security the service representative may be asked for a positive ID upon confirmation of the input data.

The control unit then transfers the relevant data to the wrench and asks the operator for a positive verification (e.g. license plate number/VIN number, barcode scan). The control unit also maintains a clear display of all the relevant information regarding the vehicle under service in the service bay where the service is in progress.

Next, an operator is guided by the torque wrench through the LCD messages to start applying the torque measurement/recording within the given limits (i.e. +/−allowed tolerance). Secondary attempts at applying torque are permitted with any error/alarm condition. Alarms will trigger a recovery sequence wherein single or multiple lug nut data points, or the entire wheel pattern may be voided. A complete walk-through of each tire location and lug nut check pattern can be performed.

After completing all torque measurements, the operator commands the torque wrench to send data back to the control unit. The control unit displays both the target torque settings and the actual torque measurements received from the torque wrench. Any over or under torque condition is indicated by a flashing LEDs or message(s) on the LCD display.

The operator then commands the control unit to send all data to the host computer before closing the work order. An employee identification or personal, code may be required for greater accountability.

The data that is sent from the control unit to the host computer include individual torque measurement(s) of each lug nut associated to each wheel of every vehicle under service. The host will then process the received information, store that information, and print the information out on the customer's invoice.

EXAMPLE 2

Infra-Red Communication Path

The hand held device 30 communicates with the shop management system 22. The technician selects a vehicle to work on from a pick list presented at the controller 28. Upon selection from the pick list, the control unit 46 queries its internal database for the vehicle associated with the repair order, or sends a request to the system 100 to query the specification database module 104 and retrieve the lug nut torque specifications for each wheel. Once the data is displayed, the technician can then beam, via infrared communication path 34, the specifications to the infrared port on the tool 20. Upon completion of the lug nut torqueing activities, the technician can beam the results of the activity back to the control unit 28 which can subsequently communicate the confirmation information and repair order number back to the shop management system 100 for storage.

EXAMPLE 3

Shop Management System and Control Unit Operation

Although a variety of shop management systems may be used in conjunction with the current system, one example of such a system is described for the purposes of illustrating the disclosed system. Reference to this shop management system is not intended to limit the present disclosure. The database used by the shop management system may be written in any commercially available programming language, may be developed using industry known database authoring programs such as Oracle, Access, SQL server, or may be developed from a combination of customizing database and generating software code to provide the functionality described hereinafter.

Programming for the database includes one or more software modules for providing the functions described hereinafter. The programming will also include modules for controlling and communicating with Input/Output interface to send control information to the tool 20 and/or control unit 46 in its various embodiments. The functions provided by the system are generally described in sequential order from setup through use.

Figure 19:
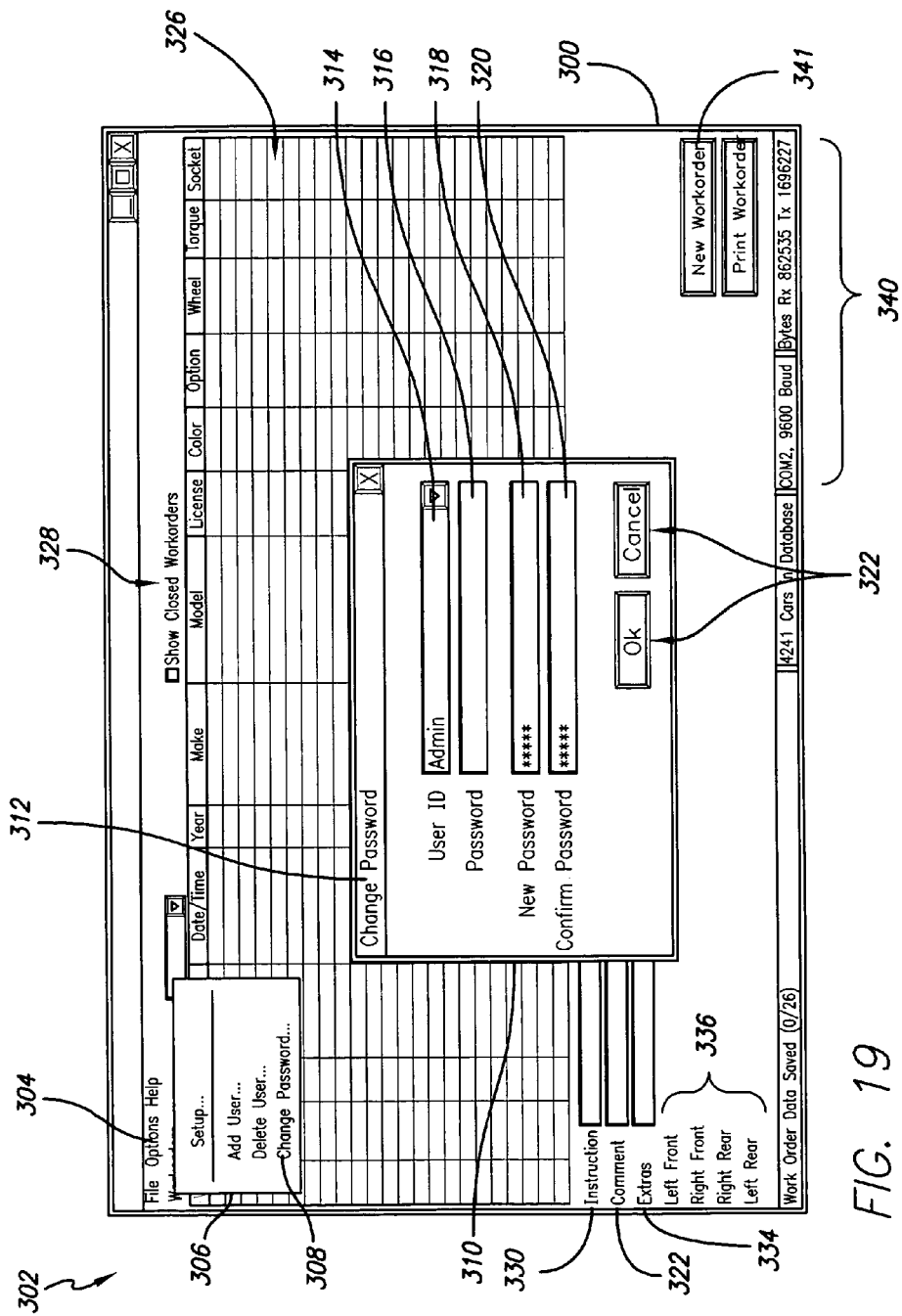
FIG. 19 is one embodiment of a work order interface usable in conjunction with the tool.

FIG. 19 shows one embodiment of the screen of the current work order database module 106 during initial user setup. Interface 300 is built on a common graphical user interface including menu selections 302 which may include one or more drop down menus such as "file," "options" 304 and "help" corresponding to functions known in common windows-based system. By selecting the options 304 menu selection, dropdown menu 306 is displayed containing selection choices Setup, Add User, Delete User and change password 308. Selecting "change password" 308, such as by clicking or moving a highlighted cursor, causes pop-up window 310 to be displayed.

Pop-up window 310 includes a label 312, in this case shown as "change password" although other labels conveying the same message may be displayed. Pop-up window 310 also includes one or more fields, along with the associated labels, related to changing the password including user ID 314, password 316, new password 318 and new password confirmation 320. Information is entered into the field by clicking within the empty field area and typing in the desired information or, as in the case of user ID 314, by selecting the drop down menu button adjacent to the field.

Pop-up menu 310 also includes control buttons 322 which may include "OK," "Cancel," or other control buttons for performing similar operations. Interface 300 also includes other information to open work orders. Information about work orders is displayed in a tabular format columns 324 to be discussed herein after. Each work order will be displayed on a row within work order summary section 326. A check box 328 for displaying only closed work orders is also positioned and available for use by the user (described below). Interface 300 also includes instruction field 330, comment field 322, extras field 334 and wheel position labels 336 which include "left front," "right front," "right rear" and "left rear." Although four tire positions are shown in the current embodiment, it is envisioned that the current system may be used for trucks and other large vehicles that may include more than four tire positions or for vehicles with less than 4 tires such as motor cycles or 3 wheeled vehicles.

Interface 300 also includes communication information 340. Communication information 340 may include but is not limited to communications port information such as "Com2" and shown transfer rate information such as 9600 baud. These settings are shown for illustrative purposes only as other communication ports or transfer rates may be used. Information about bytes transferred and bytes received may be shown as well.

Figure 20:
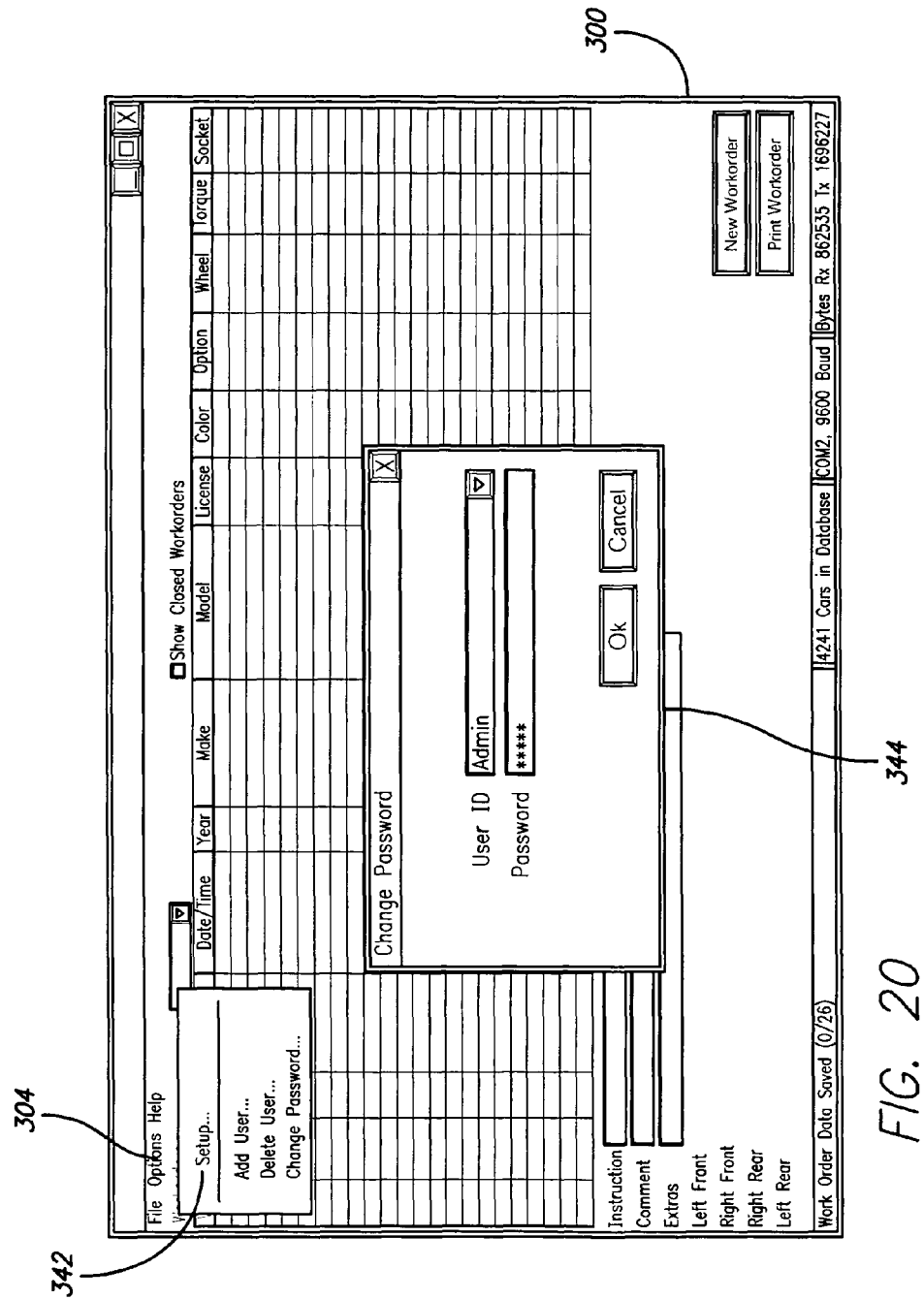
FIG. 20 is an illustrative screen display related to setup of the interface of FIG. 19.

In the next step of setting up the system, as shown in FIG. 20, by selecting the Setup menu choice 342 from the set-up menu 306, a pop-up box 344 is generated by which a user can enter a user name and password, to commence with set-up.

Figure 21:
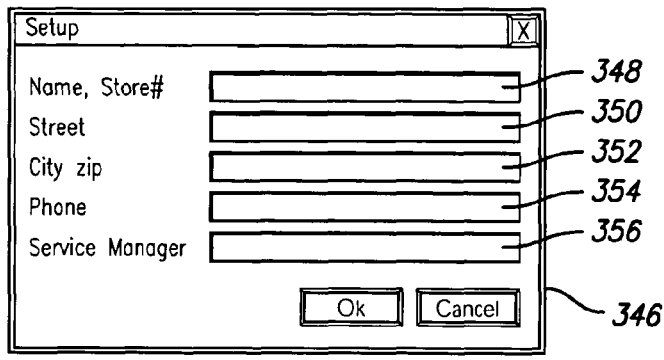
FIG. 21 is a screen display of setup window for a particular store.
Figure 23:
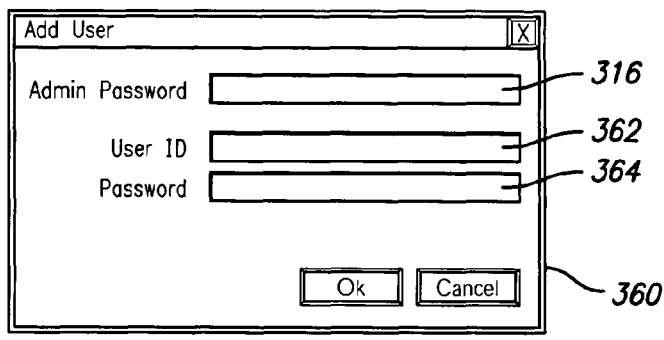
FIG. 23 is a screen display of a dialog box for adding a user.

With reference to FIG. 21, upon entering a valid user name and password, screen 346 is displayed by which a user can enter specific information about the store including, but not limited to, the store name and store number 348, the street 350, a city and zip code 352, a phone number 354 and the name of a service manager 356. It is envisioned that other information about the facility including but not limited to types of vehicles that can be serviced, quantity of staff, number of cars that are currently serviced for a given month and other such information may also be included in the set-up menu. Additional fields, fewer fields, or combinations of the fields shown may be shown as well.

Figure 22:
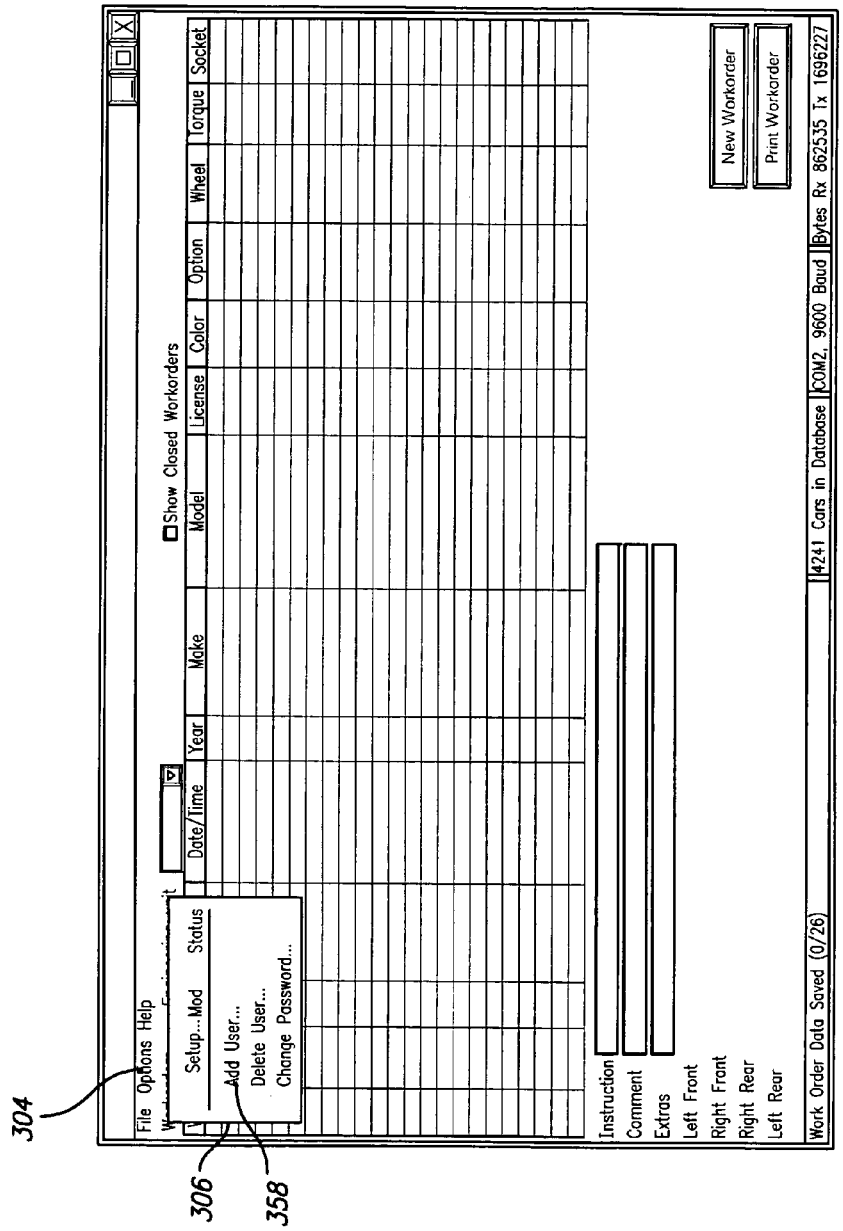
FIG. 22 is a screen display highlighting a location of an "Add User" menu selection.

With reference to FIG. 22, by selecting the add user selection 358 from the options menu 306 an "Add User" dialog box 360 is displayed by which new user information can be added upon entering a valid administrative password 316, a new user ID 362, and password for the new user ID 364. Completion of the add user process is performed by clicking on the OK control button at the bottom of pop-up box 360.

Figure 25:
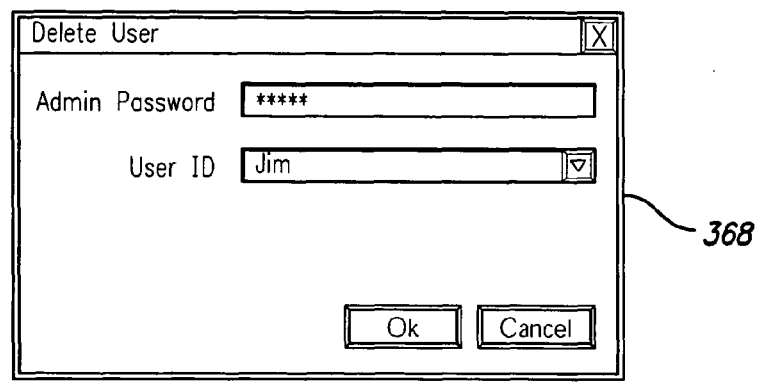
FIG. 25 is a screen display of a pop-up dialog box for selecting a user to be deleted.
Figure 24:
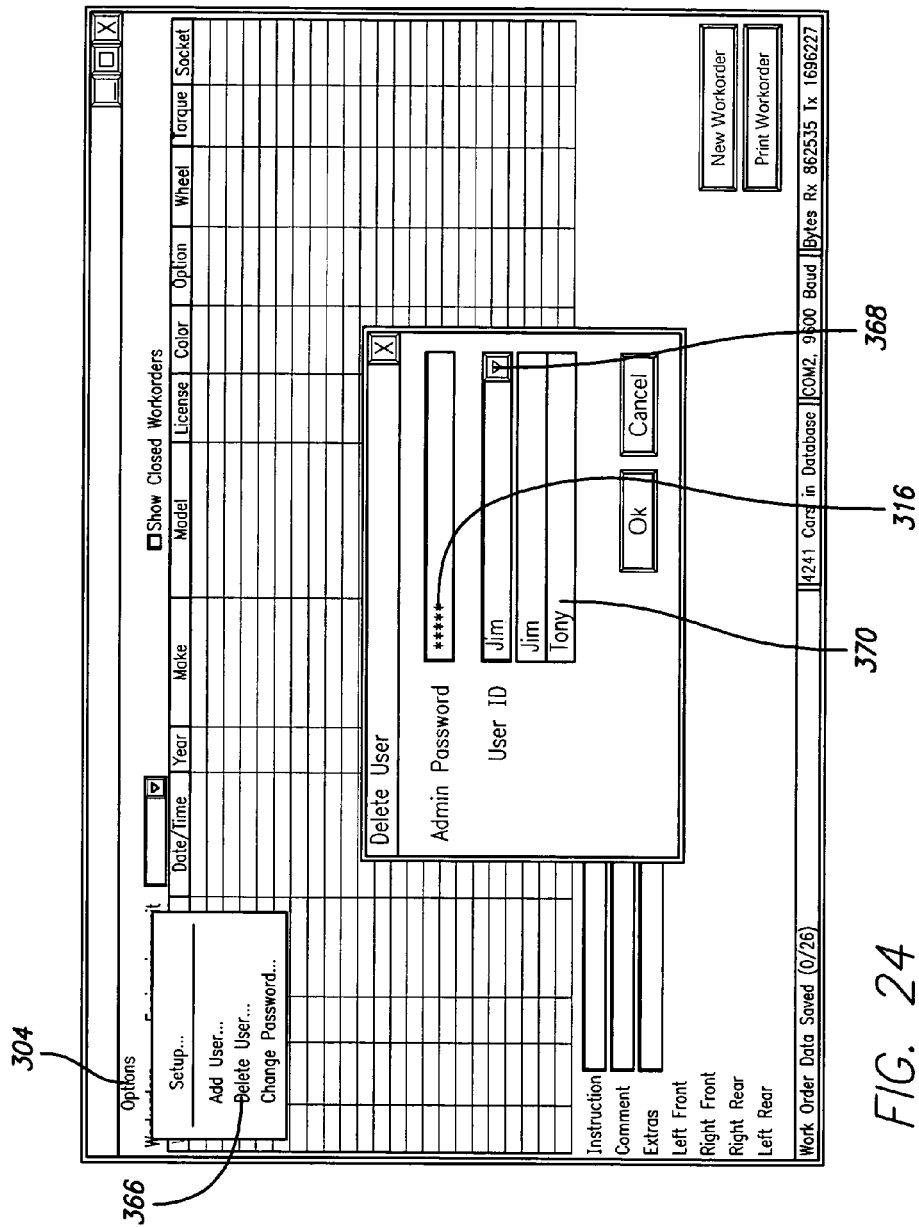
FIG. 24 is a screen display highlighting a location of a Delete User menu selection and of a pop-up box for selecting a user to be deleted.

FIG. 24-25 exemplify the process for deleting a user when a "Delete User" selection 366 is made from the options menu 304. Pop-up box 368 for deleting a user is displayed and upon entering a valid password in admin password field 316 and selecting a user to be deleted from the user ID selection menu 370, a user can be deleted. Deletion is completed by clicking an OK control button.

Figure 26:
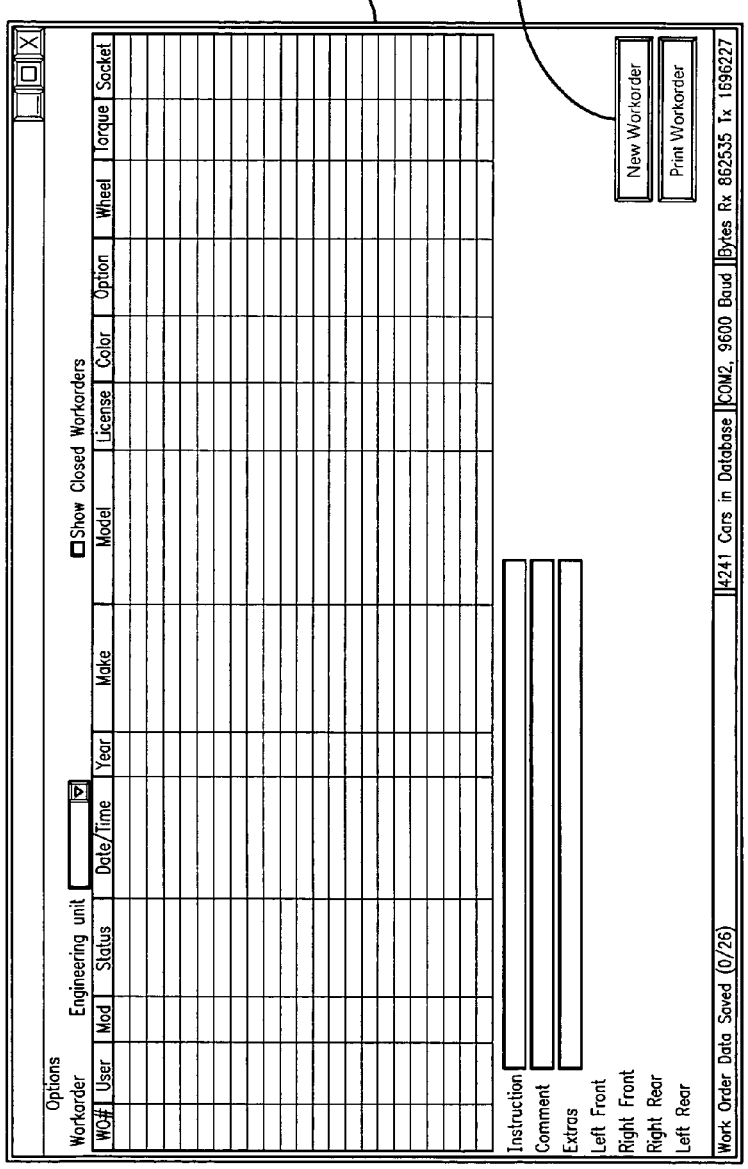
FIG. 26 is a screen display of the interface of FIG. 19 highlighting a position of a new work order button.
Figure 27:
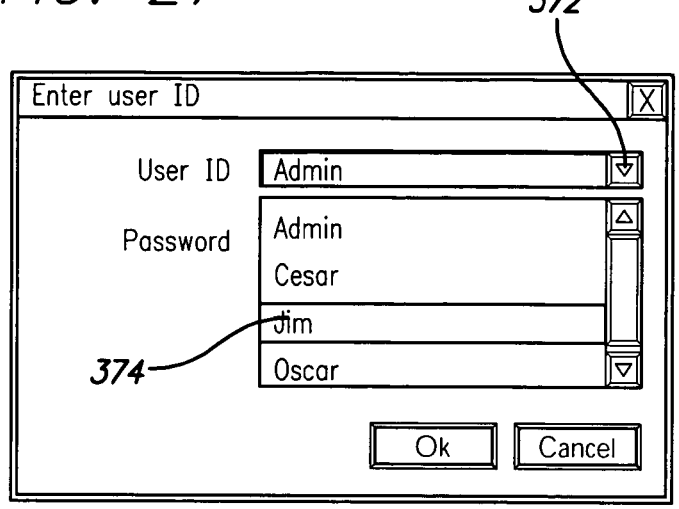
FIG. 27 is a screen display of a pop-up dialog box for selecting a user to perform a new work order.

FIG. 26 shows the interface 300 after setup has been completed highlighting New Workorder button 341. By clicking New Workorder button 341, pop-up menu as shown in FIG. 27 is displayed which allows a user ID to be selected by using the drop-down button 372 and selecting an appropriate user from the menu displayed. In the example shown in the figures, the user is Jim 374.

Figure 28:
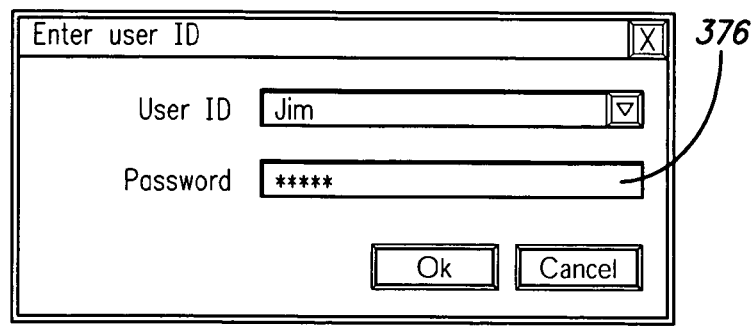
FIG. 28 is a pop-up dialog box for a user selected from the box of FIG. 27 to select a password.

Upon selection of a user ID, as shown in FIG. 28, a password is entered into password field 376 to allow the user to proceed with an operation.

Figure 29:
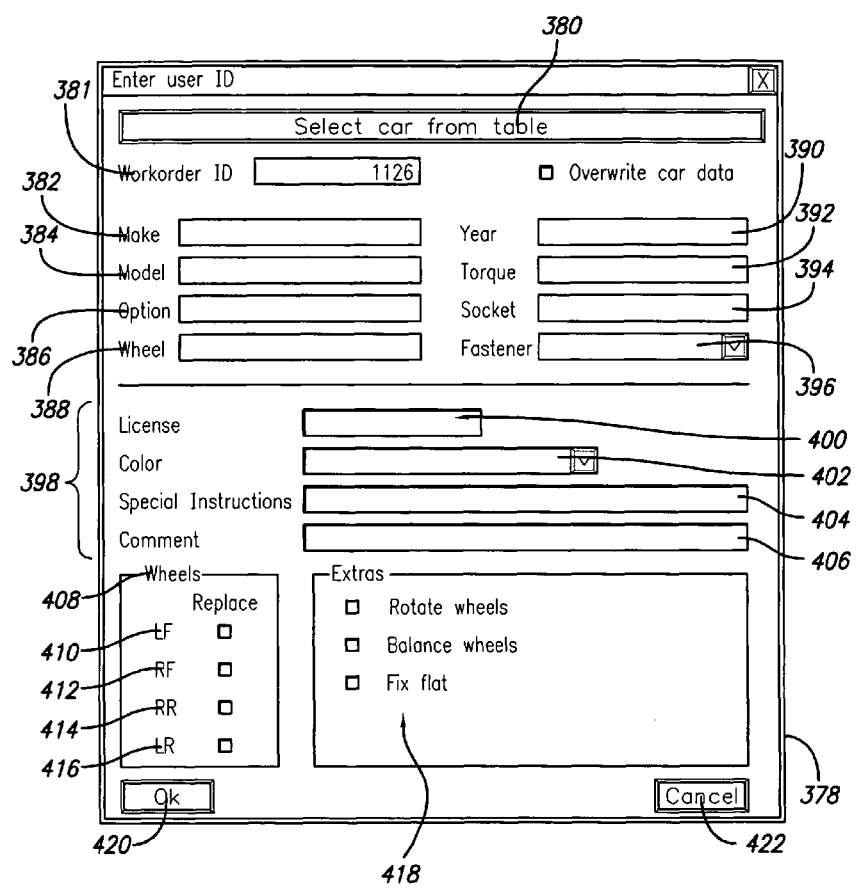
FIG. 29 is a screen display of a "create work order" dialog box.

FIG. 29 is an example of a Create Workorder screen 378. Screen 378 includes a button 380 for selecting car from a table to be discussed below. Screen 378 also includes a work order ID number 381 that will identify the particular work order. Workorder IDs may be generated sequentially to provide information about the order in which certain cars were serviced or may have another job identification scheme as desired by the facility. Information about the car is also either automatically entered by selecting a car from table 380 or manually entered into field inbox. Information about the car will include a make 382, a model 384, an option 386, a wheel or wheel type 388, a year 390 of the car which may also be selected from a drop-down menu, a torque value 392 corresponding to a particular torque application, the socket size for the tool to perform the torque application 394, and the number or style of fasteners 396. Job information specific to the car will also be entered into fields 398 which includes but are not limited to a license plate number 400, the color of the automobile 402, which may be entered by typing in the color or by selecting the color from a drop-down menu, special instructions 404 and other comments about the job 406. Designation of which wheels 408 are to be serviced is also made, which may be performed such as by checking a box indicating the owners desire to replace specified wheels.

Check boxes corresponding to the left front tire 410, right front tire 412, right rear tire 414 or left rear tire 416 are shown. For vehicles that have more than four tires, additional check boxes and additional wheel designations are displayed. An "Extras" information area including one or more check boxes may also be shown on the screen and may include any number of extra services that can be provided at the facility including, but not limited to, rotating the wheels, balancing wheels, or fixing a flat. Control buttons 420, 422 for completing the data entry are also found on screen 378.

Figure 30:
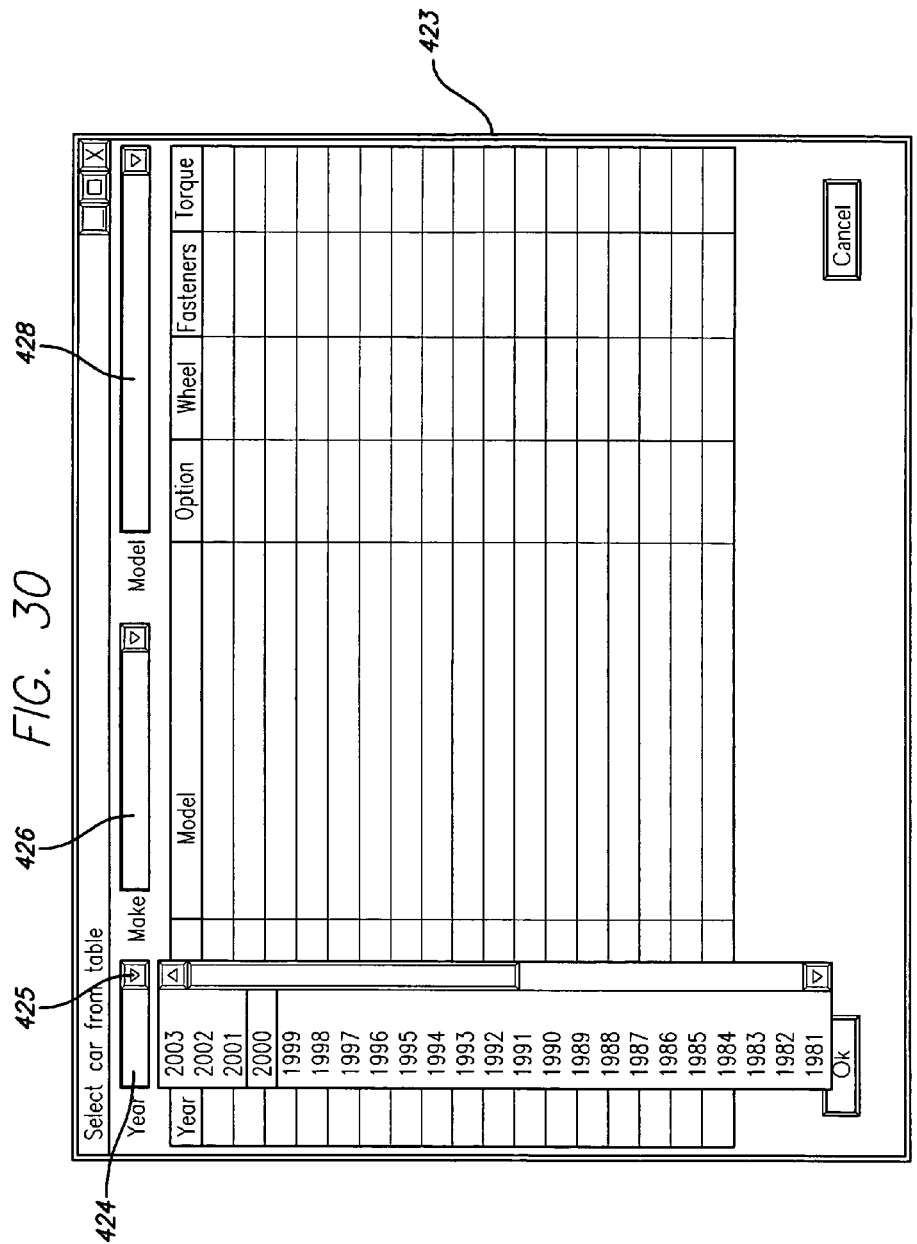
FIG. 30 is a screen display of a dialog box for selecting a car.

FIG. 30 shows a car selection screen 423 that is activated when button 380 is clicked or otherwise selected. Information about the car to be serviced is selected to retrieve operational information related to the type of automobile. The identification variable selected includes a vehicle year 424, which may be typed in or selected by clicking drop-down menu 425 from a drop list, make 426, and model 428.

Figure 31:
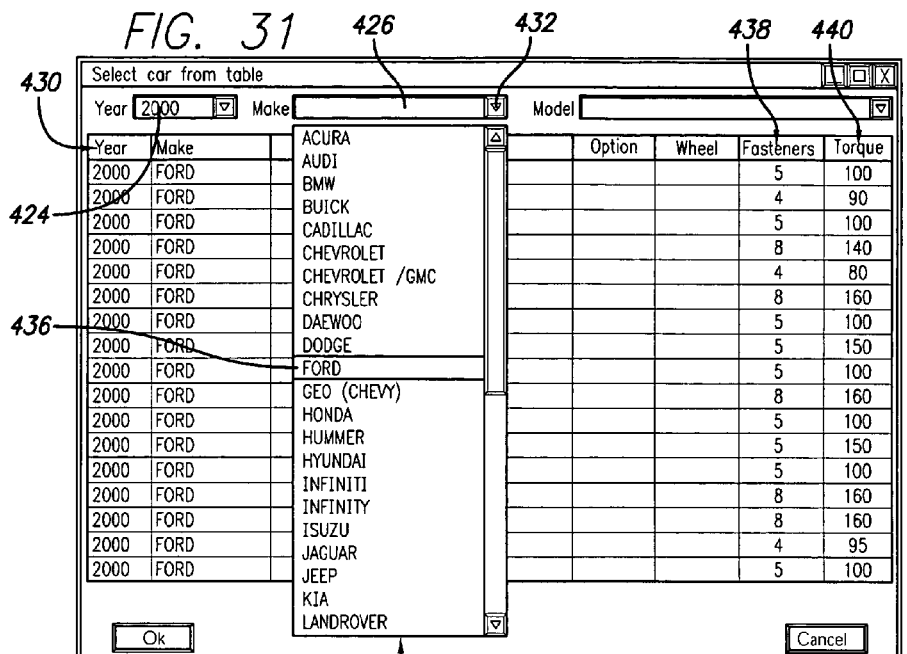
FIG. 31 is a progression of FIG. 30 after certain vehicle identifying selections have been made.

As shown in FIG. 31, after selecting the year 424 the year column 430 will be updated to show the selected year. A user is next able to select the make of the car from the make field 426 by clicking the make drop-down button 432 and selecting from a make list 434 from which a user can select a particular make of car such as, for example, "Ford" 436. After a particular make of car is displayed, all cars matching the year and make of the selected cars will be entered into the grid which will simultaneously display the number of fasteners 438 and the torque to be applied 440 for each of vehicle matching the vehicle identification variables selected.

Figure 32:
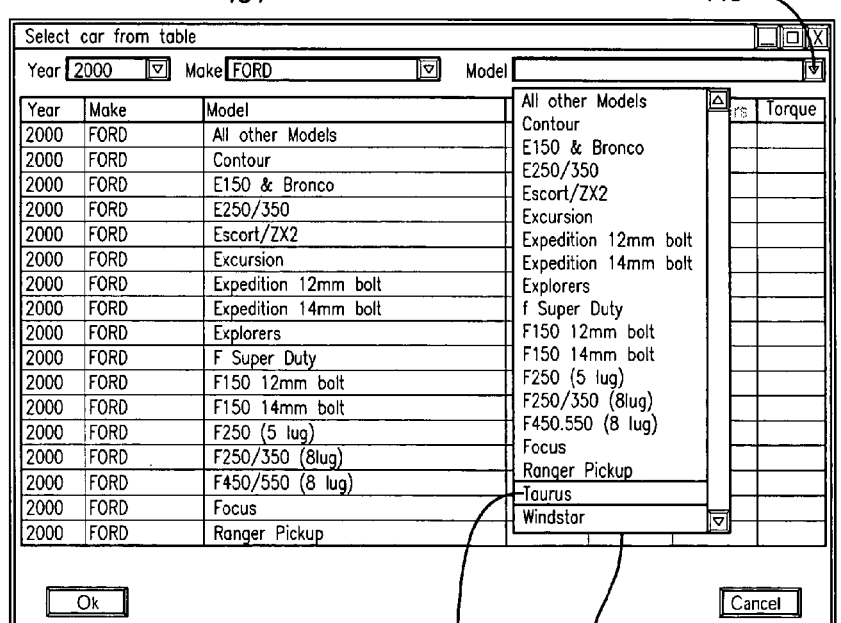
FIG. 32 is a screen display that is a further progression of FIG. 31.

Finally, as shown in FIG. 32, a particular model of car can be selected by clicking the drop-down button 443 to display model list 444 from which a user can select a particular model of car, such as, for example, the model "Taurus" 446.

Figures 33, 34:
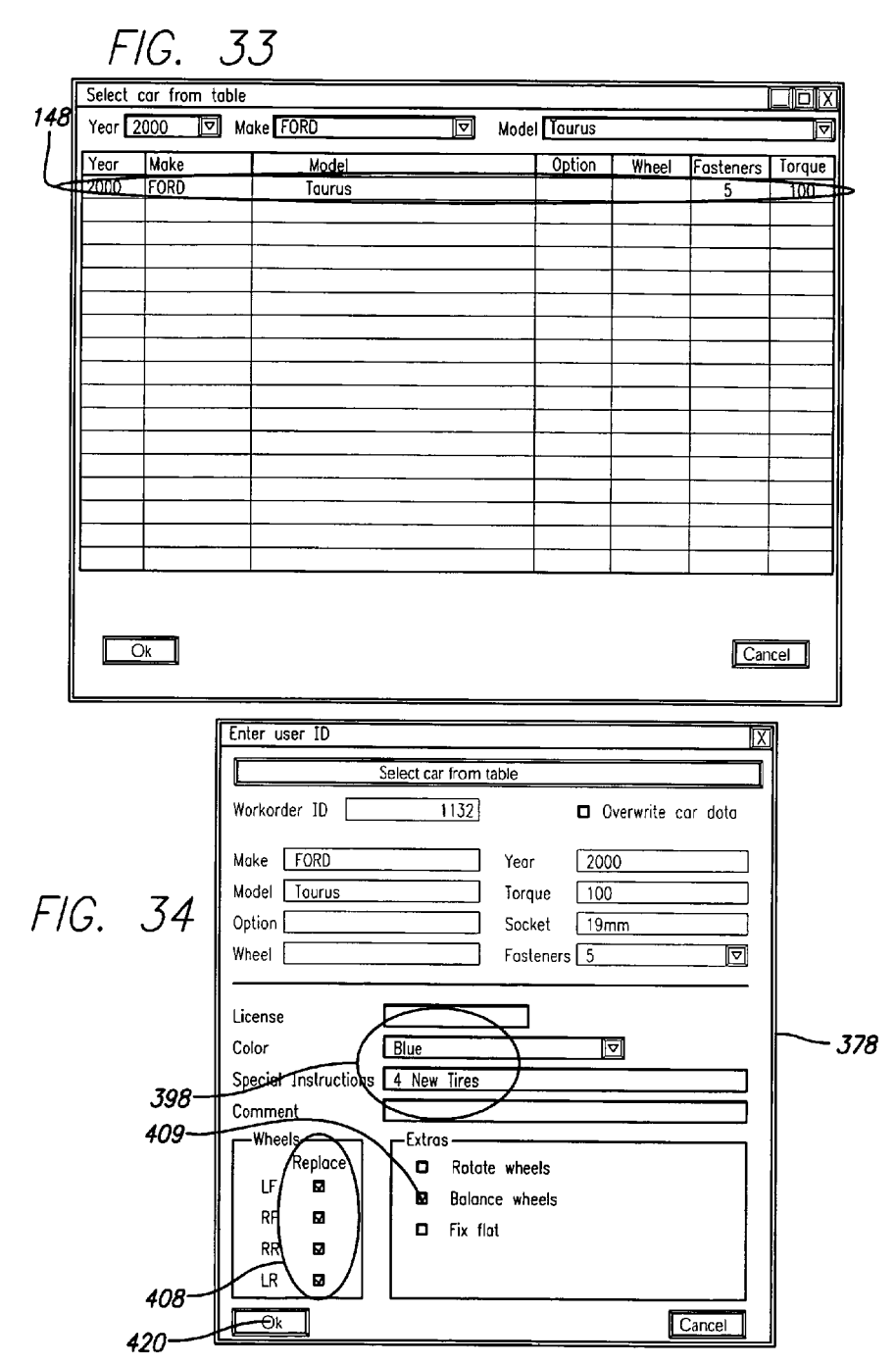

As shown in FIG. 33, the user is then presented with a list of Ford Tauruses and the user can select a particular vehicle for which corresponding operation instructions should be retrieved.

As shown in FIG. 34 this information is immediately entered into the information area 398 on the Create Workorder screen 378. A user can then select tires to be serviced by clicking the check boxes 408 and, if desired, selecting extras such as balancing the wheels 409 and then continue to the next screen by clicking the OK button 420.

Figure 35:
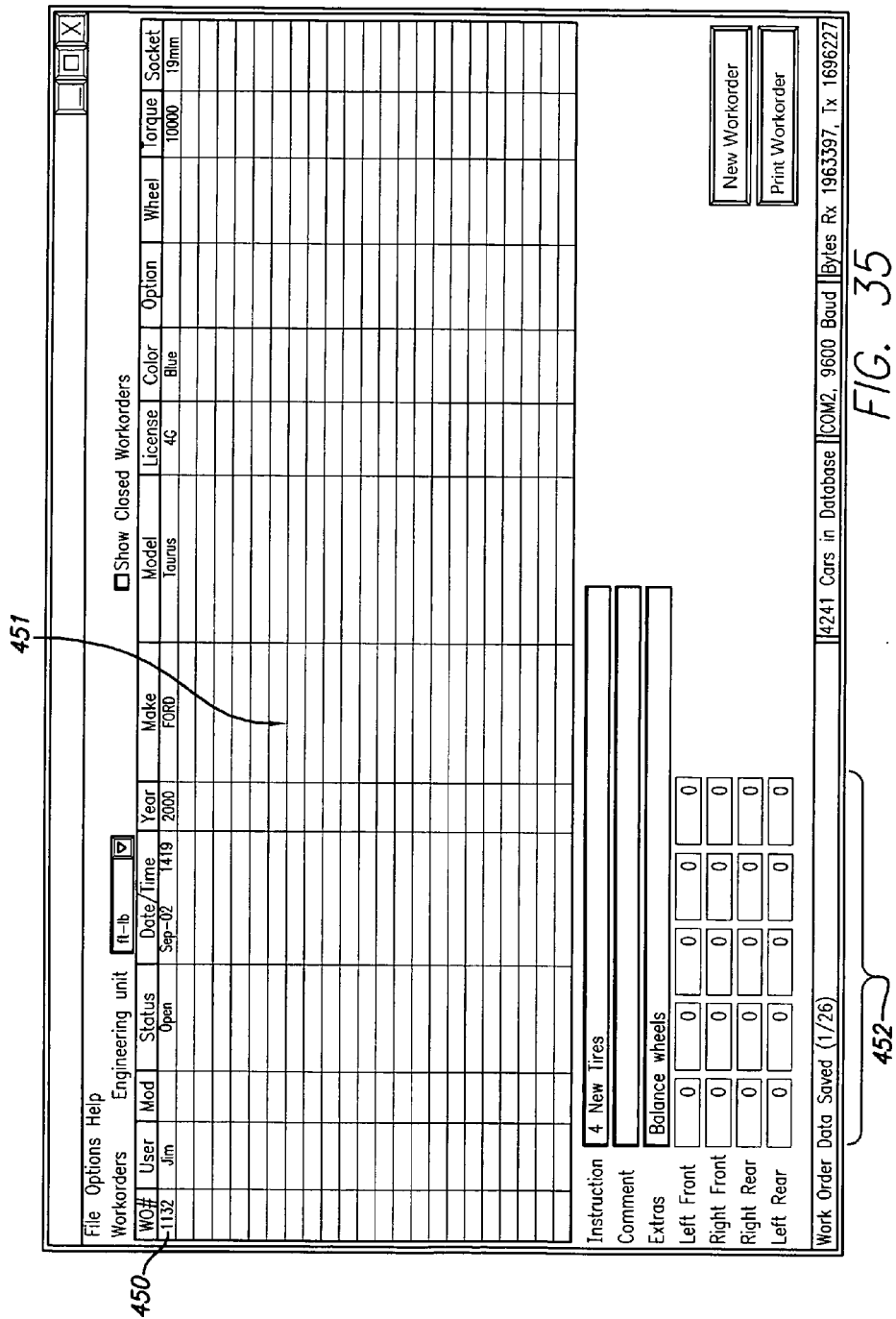
FIG. 35 is a screen display of the interface of FIG. 19 showing a completed work order row thereon.

FIG. 35 shows the interface 300 with a new Workorder 450 displayed in a first row of the Workorder table 451. Based on the operational information retrieved when the vehicle type was selected that, for the example shown, the system makes note that five lug nuts are associated with each tire. As a result, five lug nut data entry fields 452 are displayed for each vehicle tire position.

With the operation information for the tool operation and information identifying the vehicle being resident in shop management system 100 via interface 300, a technician is ready to perform the torque application on the vehicle. The operational information is sent to control unit 46.

Figure 36:
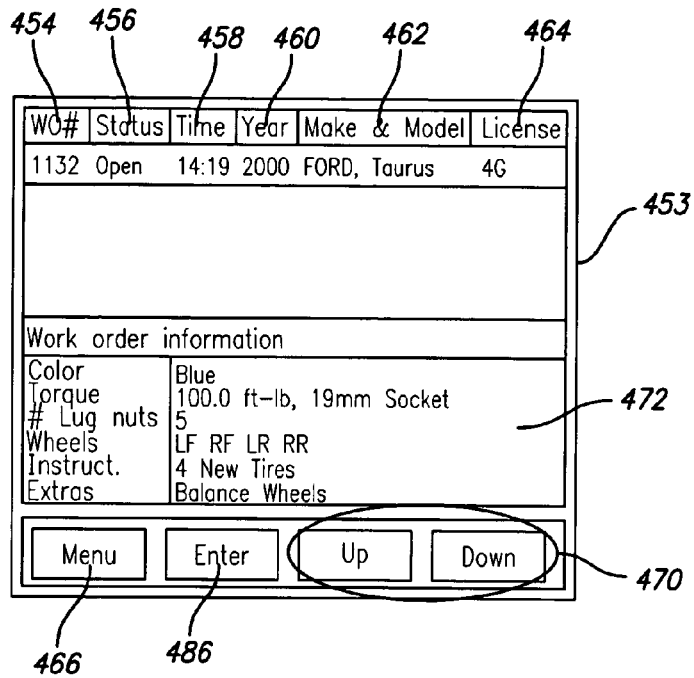
FIG. 36 is a depiction of a display screen on the control unit during a work order selection process.
Figure 37:
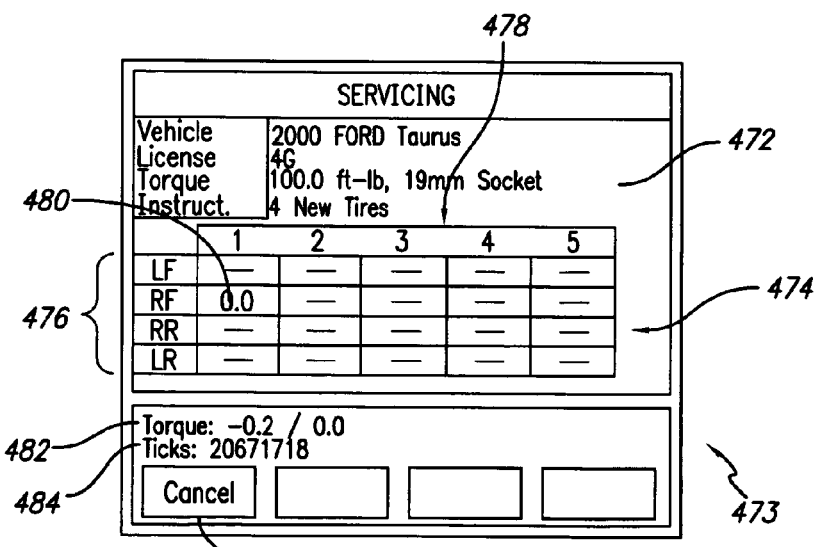
FIG. 37 is a depiction of a display screen on the control unit at a beginning of a repair application.

FIG. 36 is one embodiment of a screen display 43 visible on control unit 46. Screen display 453 will include a work order number 454, the current status of the vehicle 456, which may include entries such as open, closed or cancelled, a current time 458, the vehicle year 460, the make and model of the car 462 and the vehicle's license plate number 464. Screen 453 will also include information 472 related to the work order including the color of the vehicle, the torque numbers that correspond to the vehicle as selected from the vehicle selection steps described above, the number of lug nuts per wheel, the wheels to be serviced, special instructions and any extra instructions that are required for the vehicle. If more than one work order exists it will be listed and can be selected by using the "up-down" control buttons 470 and clicking the enter button 468 when a desired work order is reached. The menu button 466 is also available to select additional menu items. When a desired Workorder is selected, a servicing screen 413 is displayed such as shown in FIG. 37.

The servicing screen will include information again about the particular work order 472 as well as a matrix 474 for viewing information during operation. In the embodiment shown, matrix 474 positions vehicle identification indicators 476 along the left side and lug numbers 478 along the top although other positioning can be used. The current tire and lug nut combination cell will be highlighted such as the right front tire first lug combination 480 in the screen shown. Not yet tested lug nuts will be displayed with two dashes or some other indication that a particular lug nut has not yet been serviced. Additional information about the test status such as the torque currently being applied 482 and the number of ticks processed 484 are also displayed. At any time before the current operation is completed, a cancel button 486 can be clicked to cancel the current measurement being recorded.

FIG. 38 shows the progression of the operation with three more lug nuts being tested for right front tire 488. Lug nuts are not necessarily serviced in a clockwise or counter clockwise pattern, but instead using a star replacement pattern known in the industry. FIG. 39 shows a further progression after two tires have been serviced and lug nut one of the left front tire is being serviced. As the torque is being applied, the torque measurements or generally "service information" in the case of a tool used for torque and other types of measurements is recorded to the tool and control unit.

FIG. 40 shows a screen after all testing has been completed. After grid 489 is completed, a message is displayed to the user, such as the example shown "Completed! Accept" 490, and an accept button 491 is displayed which can be clicked to indicate that servicing has been completed. After the repair process is completed, a user can go back to interface 300 to review the collected date and perform other managerial functions such as reordering the results and printing reports.

Figures 41, 42:
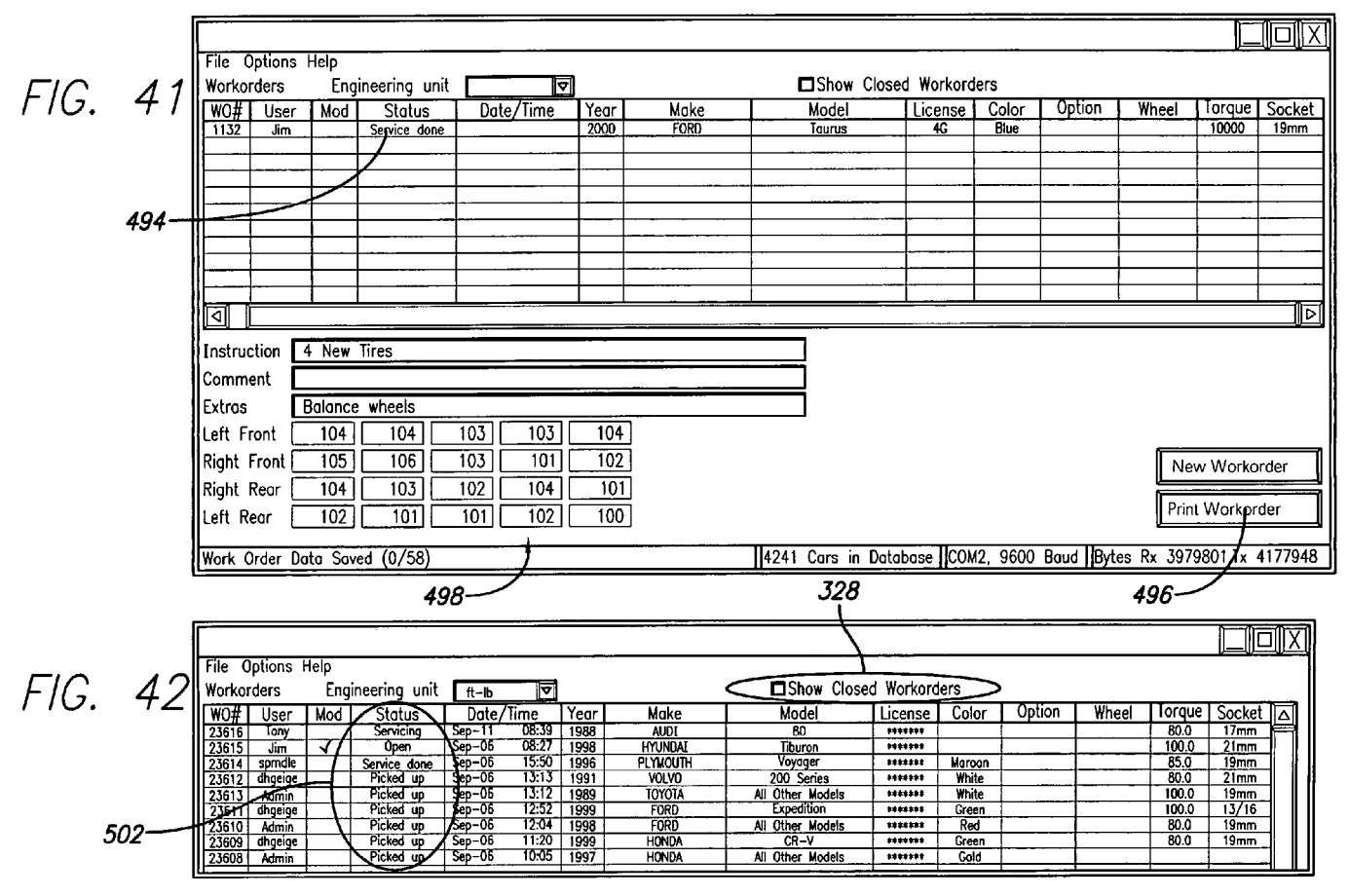

As shown in FIG. 41, the service order screen updates the current status of the work order by displaying a service done 494 message in the status column. A print order button 496 is also displayed allowing printing of the results. In the lower left hand corner of work order screen, the results of the testing for each lug nut for each of the selected wheels is also displayed.

FIG. 42 is an example of a screen that utilizes the show closed work orders check box 328. By clicking the check box 328, only work orders that have been completed are displayed in the grid. FIG. 42 also shows the various statuses that can be shown for closed workorders.

Figure 43:
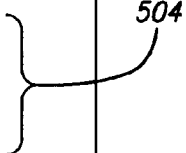
FIG. 43 is an example of a service report.

FIG. 43 is an example of a report that can be generated by the current system. FIG. 43 is shown only as an example of one report since many other layouts for reports can be utilized as well and still be within the scope of this disclosure. The torque data results 504 for the testing are displayed in the report for review by a vehicle owner and for filing for later retrieval by the service facility.

Figure 44A:
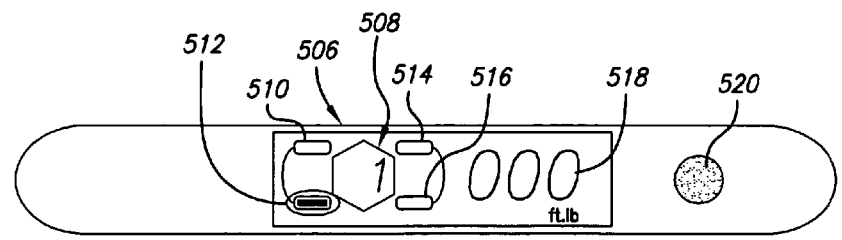
FIG. 44A-D are progressions of display on the tool during a service operation.

In addition to using a control device having screen displays such as those shown in FIGS. 36-40, a technician can also view information related to the torque application to be performed directly on the tool's display 50. FIGS. 44A-D show one embodiment of a progression of screens of display 30 as the screens appear during testing. The display 30 includes a stylized vehicle representation 506 which generally corresponds to the shape of a vehicle including four tire indicators 510, 512, 514 and 516 corresponding to the rear left, rear right, front left and front right tires respectively. Vehicle representation 506 also includes a vehicle lug nut indicator 508 shown as a hexagonal box with a roman numeral displayed therein. As shown in FIG. 44A, the current vehicle tire being serviced is the rear right tire as indicated by a bar within tire indicator 512. The display 30 also includes a measurement reading 518 shown as 000 with a unit indicator shown adjacently, in this embodiment as ft·lbs. Control button 520 is actuated by the user to select a tire that is about to be serviced.

Figure 44B:
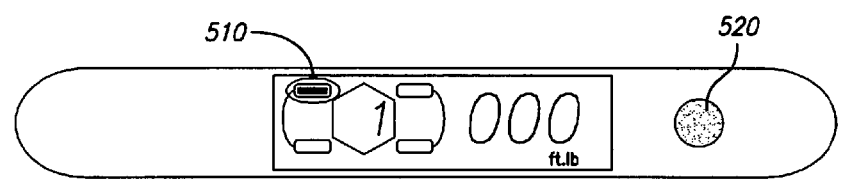
Figure 44C:
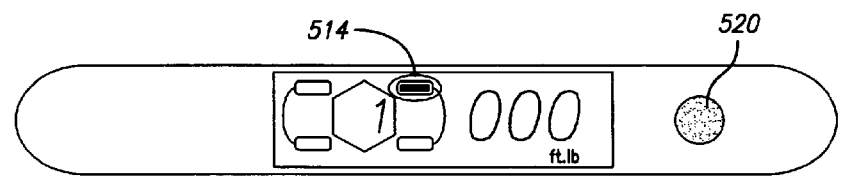
Figure 44D:
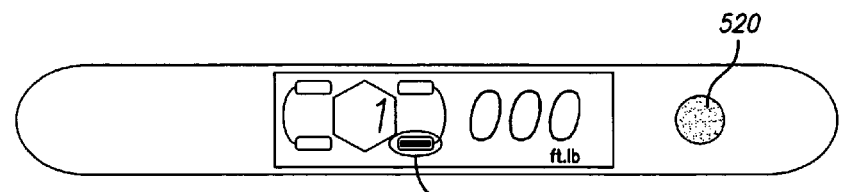

FIG. 44B shows the progression moving to the next tire which is the left rear tire as referenced by indicator 510. By actuating button 520 again the indicator moves to the left front tire 514 (FIG. 44C) and by pushing the button again to front right tire 516 (FIG. 44D).

Figure 45A:
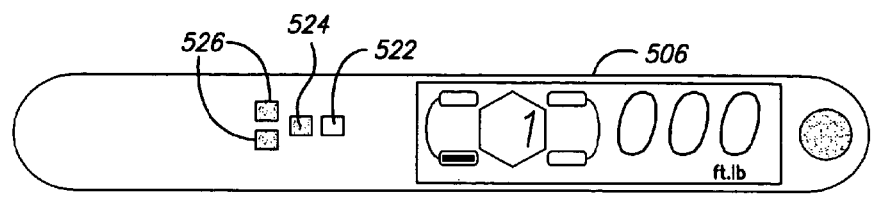
FIG. 45A-F are progressions of the display on the tool in conjunction with torque indicator lights.
Figure 45B:
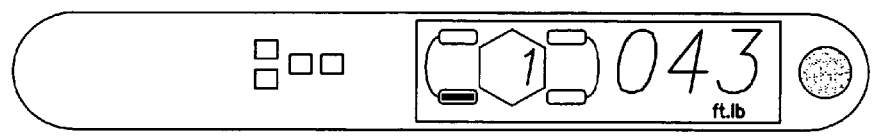
Figure 45C:
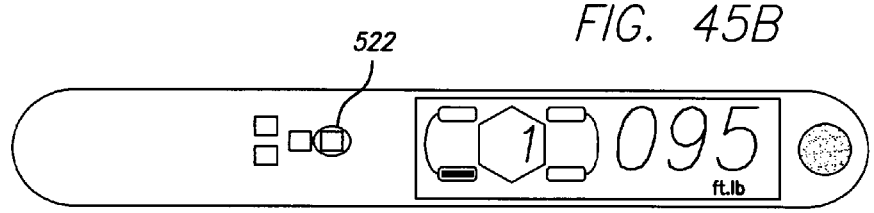
Figure 45D:
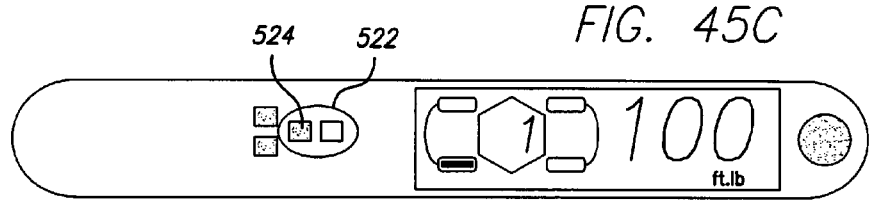
Figure 45E:
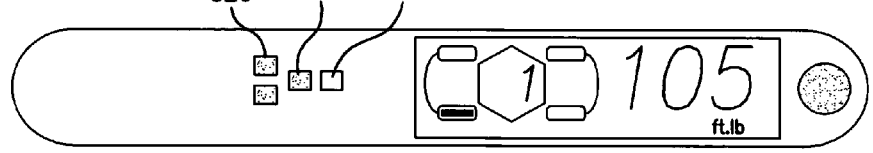
Figure 45F:
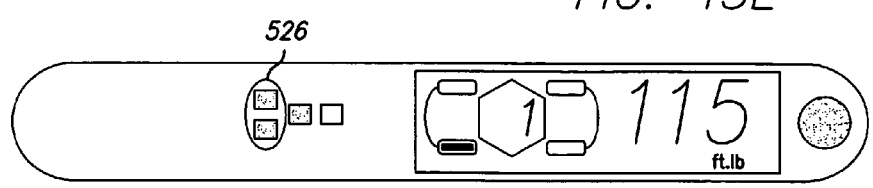

FIG. 45A-F show a progression of displays 506 as a service operation that requires 100 ft·lbs of torque is being performed including the indicator lights 522, 524, 526 and how they operate in response to certain measurements being shown on the device. 45A shows an initial stage with the right rear tire selected with no indicator lights being active or illuminated because no torque is being applied. FIG. 45B shows a reading of 43 ft·lbs of torque is being applied during an operation. No indicator lights are shown because no threshold has been reached that interest a user, in contrast to the threshold values described hereinafter. FIG. 45C shows a reading of 95 ft·lbs at which point 95% of total applied torque threshold has been exceeded at which time a first indicator light or approach light 522 is illuminated in a yellow color to caution the user that the required torque is being approached and an approach condition has been reached. Although 95% is used as an approach condition threshold, other suitable values may be used as well. FIG. 45D shows the target applied torque being achieved and yellow indicator light 522 being illuminated and target indicator light 524 being illuminated in a green color to indicate that the desired torque has been achieved. FIG. 45E shows all three sets of indicator lights 522, 524, and 526 being illuminated when the desired torque has been exceeded. Caution set of indicator lights 526 is illuminated in a red color to indicate to the user that torque application should be ceased. FIG. 45F shows a reading of 115 ft·lbs which is an over-torque condition, at which point caution indicators 526 are illuminated. Although 115% of the target applied torque is used to designate an over-torque condition, other values may be sued as well. In this manner, the user can use the tool to perform tests, record readings and at the same time have indicators to guide the user with respect to an amount of torque that should be applied. Although one approach indicator, one target indicator, and a set of two caution indicators are shown, other types of indicators, or other color combinations may be used as well. Other combinations may be used as well as long as the third alert corresponding to the over-torque condition is more intense than the second condition corresponding to the target torque condition, and the second condition is more intense to the first condition which corresponds to an approach condition. An alert being "more intense" may include being brighter, being larger in diameter so as to produce a more visible alert, flashing more frequently, and so forth.

Figure 46:
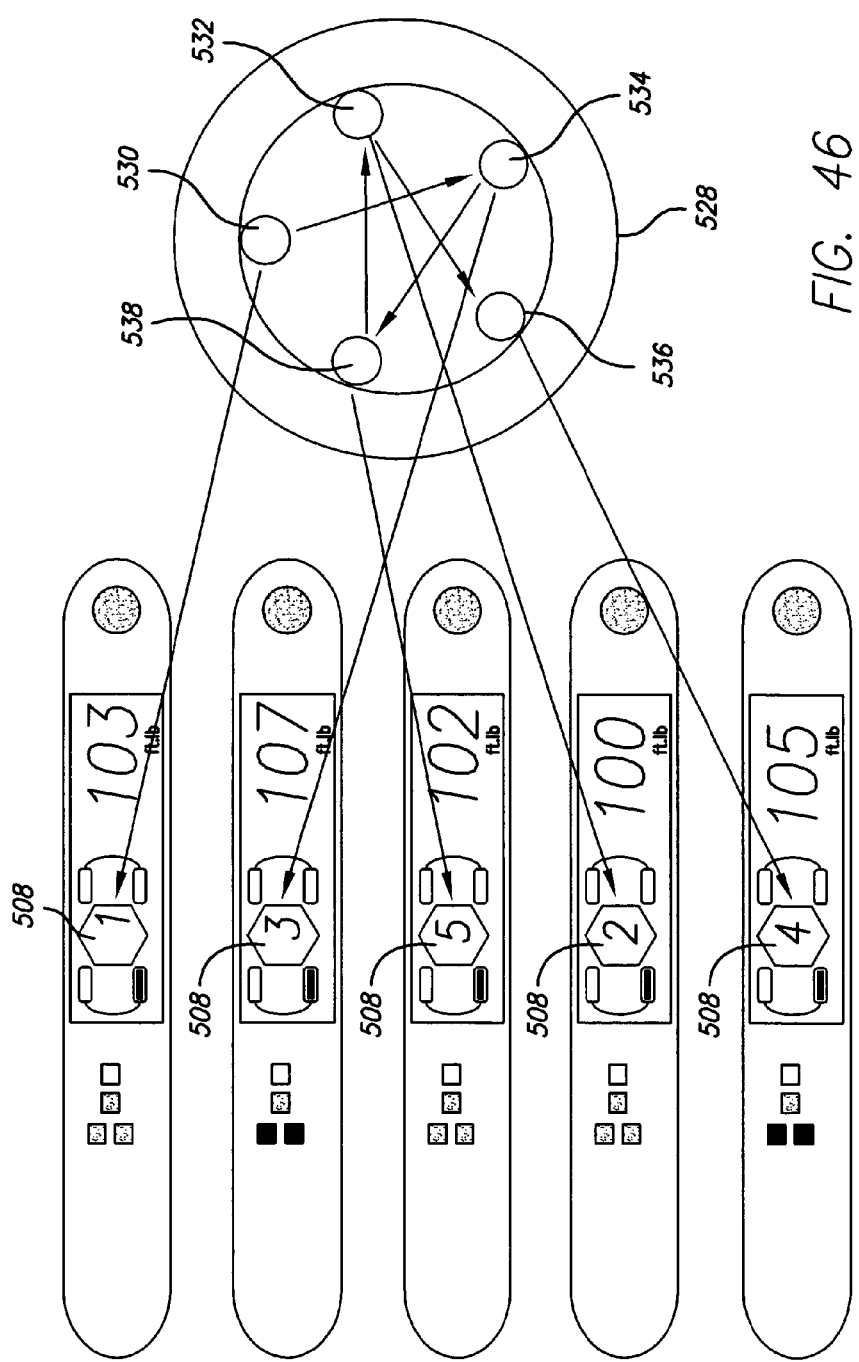
FIG. 46 is an illustration of a recommended tightening pattern corresponding to servicing a tire having five lug nuts is displayed on the tool display.

Lug nuts are not necessarily serviced in consecutive order. Instead, most operating guides, in order to better handle balancing of the tire during removal and replacement, recommend using a lug nut service pattern that is a star pattern 528 or other pattern which does not sequentially follow the perimeter of the lug arrangement such as shown in FIG. 46. These patterns generally balance this operation by attempting to avoid operating on neighboring lug nuts. Exceptions include 3 and 4 lug nut patterns. Star pattern requires a first lug nut 530 to be removed or replaced first followed by a third lug nut 534, a fifth lug nut 538, a second lug nut 532 and finally a fourth lug nut 536. The indicator screen controller is programmed by the operational information to show the correct lug nut sequence.

Figure 48:
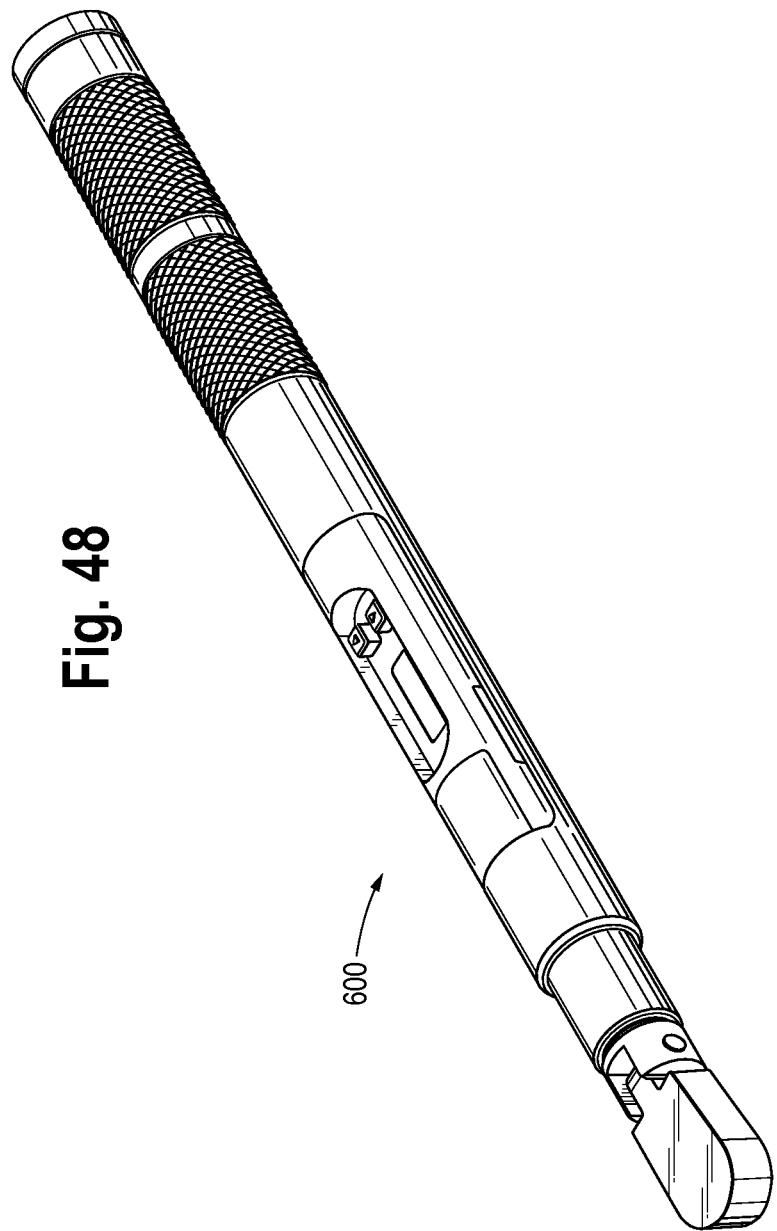
FIG. 48 is another embodiment of a tool.

FIG. 48 illustrates another embodiment of a tool 600 in accordance with the present application. FIG. 49 illustrates an exploded view of the tool 600 components. The tool 600 is operatively and wirelessly connected to a shop management system to wirelessly communicate information, such as torque values, from the tool 600 and to the shop management system. In this manner, the shop management system can communicate specified torque values that should be applied by the tool 600 to a work piece, such as a bolt or nut. Also, the tool 600 can communicate with the shop management system to transmit information, such as the actual torque applied to the work piece, so the shop management system can log this information for future retrieval. Accordingly, two-way, wireless communication between the tool 600 and the shop management system is facilitated, providing specified torque values for the user to apply when fastening a work piece and the actual torque values applied to the work piece can be logged by the shop management system, in addition to any other information, features or functions.

As shown in FIG. 49, the tool 600 includes a handle 605 with a substantially cylindrical tube 610 provided within the handle 605 to receive an extension 615. The extension 615 is adapted to hold a yoke 620 therein. The yoke 620 includes a torque measuring device 625, such as a strain gauge or other device capable of measuring torque applied by the tool 600 to a work piece. The torque measuring device 625 can include wires or other communication means for operatively connecting with internal circuitry of the tool 600, described below in more detail. In an embodiment, attached to the yoke 620 is a ratchet head 635 adapted to apply torque to a work piece, such as, for example, a bolt having a hex-head engagement. It will be appreciated that any other type of tool head intended to apply torque can also be used, such as, for example, screwdriver heads, wrench heads and the like. A bezel assembly 640 may also be provided and includes functional items in the form of a display that can be viewed or activated by the user to more effectively use the tool 600. A power source 645, such as fuel cell or battery, can be included inside the tube 610 and held in place by a power source tray 650, which is coupled to the tube 610 by end cap 655.

The handle 605 can include a gripping portion that allows a user to grasp the tool 600 in order to apply torque to a work piece in a well-known manner. The gripping portion can be separate from, or integral with, handle 605, can be a pattern that is machined into the handle 605 or a separate rubber grip attached to the handle 605.

The ratchet head 635 can be any tool component that is capable of applying torque to a work piece. In an embodiment, the ratchet head 635 is a head that operates with a socket to turn a work piece in a well-known manner. However, the ratchet head 635 can be a set of pliers, claws, screwdriver head, or any other tool capable of applying torque to a work piece.

The power source 645 can be any power source capable of providing electrical power to the tool 600. In an embodiment, the power source 645 is one or more single cell batteries, such as, for example, lithium ion (Li-ion) batteries. It is to be understood that other portable power devices can be used, such as, for example, fuel cells solar power cells, or the like.

FIG. 50 illustrates an exploded view of bezel assembly 640. As shown, the bezel assembly 640 includes a transceiver 660 disposed within a housing 665, and held within the housing 665 by a bracket 667. A cover 670 can also be provided to further enclose the transceiver 660 within the housing. In an embodiment, a wireless diffuser 675 is provided adjacent to the transceiver 660 and operatively coupled to a printed circuit board 680 (PCB). A liquid crystal display (LCD) 685 may be provided in the bezel assembly 640, for example, attached to the PCB 680, to provide information to a user. A keypad 690, push buttons or other input means can also be included in order to facilitate interactation with the LCD 685 and allow the user to enter information into the LCD 685, thereby creating a user interface. In an embodiment, the bezel assembly 640 can include a vibration motor 695 to provide a tactile alert to the user when information has been received by the transceiver 660, when a specific torque has been achieve, when an over-torqued condition has occurred, or for any other reason Light emitting diode (LED) lights 700 can also be provided on the printed circuit board 680 to notify the user when, for example, a designated amount of torque has been applied to the work piece. In an embodiment, LED lights 700 can each be different colors, depending upon torque application. For example, there can be a single green LED, indicating proper torque application, a yellow LED, indicating proper torque application is approaching, and a red LED, indicating an over-torque condition.

In an embodiment, the transceiver 660 is aligned substantially axially, relative to the longitudinal axis of the tool. The transceiver 660 can be generally L-shaped. The transceiver is adapted to communicate by any wireless communication means, for example, 802.11, RF, infrared, Bluetooth, or any other form of wireless communication.

A bracket 667, preferably metallic or other conducting material, can couple the transceiver 660 to the tube 610 with a screw or other attachment means to provide a larger ground plane for the transceiver 660, thus increasing the gain and range of wireless communication transmitted to and from the transceiver 660. In essence, the attachment of the transceiver 660 to the tube 610 allows virtually the entire tool 600 to act as a receiver of wireless communications, albeit the transceiver 660 is the backbone for such communications.

The printed circuit board 680 includes many of the electrical components needed to facilitate the wireless communication between the tool 600 and shop management system. For example, the printed circuit board 680 can include memory, such as flash memory or other solid state memory devices, to store values of torque from the tool 600, and can operably connect the transceiver 660, battery 645, diffuser 675, LCD screen 685, keypad 690 and vibration motor 690, as well as any other electrical components that are associated with the tool 600.

The printed circuit board 680 includes many of the electrical components needed to facilitate wireless communication between the tool 600 and shop management system. For example, the printed circuit board 680 can include memory to store specific and/or actual values of torque from the tool 600, and can operably connect the transceiver 660, battery 645, diffuser 675, LCD screen 685, keypad 690 and vibration motor 690, as well as any other electrical components associated with the tool 600.

Several exemplar methods of operating the tool 600 and shop management system will now be discussed. A user can activate the keypad 690 to ask the shop management system what the specified amount of torque should be applied to a designated work piece, such as a blot, screw, bolt or the like. In an embodiment, the user can use the LCD screen 685 with input buttons to scroll through several different types of work pieces and select the work piece that is being fastened. Upon selecting the appropriate work piece, the shop management system may send a specified torque value that should be applied to the work piece to the tool 600, which can be displayed on the LCD screen.

When the user applies the specified amount of torque to the work piece, that torque value is sensed by the torque measurement device 625 and transmitted to and stored with the memory of the tool 600. The LEDs and/or vibration device can alert the user that proper, specified torque has been achieved. The actual applied torque values can thereafter be sent by the tool to the shop management system without any user interaction with the tool 600, or can be manually transmitted to the shop management system if the user enters the appropriate information into the keypad 690.

In an embodiment, the shop management system can manage a plurality of tools 600 by assigning each tool with a unique Internet Protocol (IP) address or other type of addressing means. In this manner, each tool can be uniquely identified regardless of the location of the tool, and the shop management system can wirelessly transmit different information to each of the tools based on the various tasks of each tool.

The LED lights 700 can also interact with the transceiver 660 and the torque measurement device 625 to indicate to a user when a designated amount of torque has been applied to the work piece. For example, if the shop management system determines that 90 foot-pounds is the specified amount of torque to be applied to a particular work piece, the LED lights 700 can light in a green color once the torque measurement device 625 determines that 90 foot-pounds of torque has been applied to the work piece. If the user over-torques the work piece, for example, to 110 foot-pounds, the LED lights 700 can light in a red color to notify the user that the work piece has been over-torqued. In another embodiment, the LED lights 700 can light sequentially visually informing the user that the specified torque is being reached. In another embodiment, when the specified amount of torque is applied to the work piece, the ratchet head 635 can be disposed in a locked in position or disengaged from the tool 600 so that additional torque can not be applied to the work piece in order to avoid an over-torquing condition. The shop management system can then unlock the tool when deemed appropriate.

The foregoing example and other examples set forth in this description are not intended in any way to limit the scope of the present applications and appended claims. Rather, these are provided as examples to further help understand and enable the described device, method and system. These examples are intended to be expansive to be broadly interpreted without limitation. It is envisioned that those of ordinary skill in the art may devise various modifications and equivalents without departing from the spirit and scope of the disclosure. Various features have been particularly shown and described in connection with the disclosure as shown and described, however, it must be understood that these particular arrangements and methods merely illustrate, and that the disclosure is to be given its fullest interpretation within the terms of the appended claims.

What is claimed is:

1. A tool adapted to be coupled with a driver to engage and apply an amount of torque to a work piece, the tool comprising:
   a driver controller operably coupled to the driver and adapted to measure the amount of torque applied to the work piece;
   a tube coupled to the driver controller; and
   a transceiver coupled to the tool and including a first planar portion having a first width extending in a first direction and a first length extending in a second direction perpendicular to the first direction, and a second planar portion extending perpendicular to the first planar portion and having a second width extending in the first direction and a second length extending in the second direction, wherein the transceiver is adapted to wirelessly transmit information relating to the amount of torque.

2. The tool of claim 1, wherein the transceiver is coupled to the tool by a bracket.

3. The tool of claim 1, wherein the driver controller is adapted to record service information including data relating to the amount of torque.

4. The tool of claim 1, wherein the transceiver is disposed within a cavity of the tool.

5. The tool of claim 1, further comprising a memory adapted to store the information.

6. The tool of claim 1, further comprising a power source adapted to supply power to the transceiver.

7. The tool of claim 1, further comprising an indicator adapted to notify a user of the tool when the tool applies a predetermined amount of torque to the work piece.

8. The tool of claim 7, wherein the indicator is a light.

* * * * *